(12) United States Patent
Chun et al.

(10) Patent No.: US 10,798,639 B2
(45) Date of Patent: Oct. 6, 2020

(54) CONNECTION TRY METHOD AND USER EQUIPMENT, AND CONNECTION CONTROL METHOD AND BASE STATION

(71) Applicant: LG Electronics iNC., Seoul (KR)

(72) Inventors: Sungduck Chun, Seoul (KR); Jaehyun Kim, Seoul (KR); Ki-Dong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/322,757

(22) PCT Filed: Aug. 2, 2017

(86) PCT No.: PCT/KR2017/008327
§ 371 (c)(1),
(2) Date: Feb. 1, 2019

(87) PCT Pub. No.: WO2018/026185
PCT Pub. Date: Feb. 8, 2018

(65) Prior Publication Data
US 2019/0174392 A1 Jun. 6, 2019

Related U.S. Application Data

(60) Provisional application No. 62/372,811, filed on Aug. 10, 2016, provisional application No. 62/369,766, filed on Aug. 2, 2016.

(51) Int. Cl.
*H04W 48/02* (2009.01)
*H04W 48/08* (2009.01)
(Continued)

(52) U.S. Cl.
CPC ........... *H04W 48/02* (2013.01); *H04W 16/02* (2013.01); *H04W 48/08* (2013.01); *H04W 48/14* (2013.01)

(58) Field of Classification Search
CPC ...... H04W 48/02; H04W 48/00; H04W 16/02
See application file for complete search history.

(56) References Cited

U.S. PATENT DOCUMENTS

2007/0140167 A1* 6/2007 Jang ............... H04W 72/10
370/329
2009/0177675 A1 7/2009 Trumbull et al.
(Continued)

FOREIGN PATENT DOCUMENTS

JP 2009105758 5/2009
JP 2013532930 8/2013
(Continued)

OTHER PUBLICATIONS

Xi J et. Al, "Wireless multihop internet access: gateway discovery, routing, and addressing," Proceedings of the International Conference on third Generation Wireless and Beyond, May 2002, 7 pages.
(Continued)

*Primary Examiner* — Jinsong Hu
*Assistant Examiner* — Farideh Madani
(74) *Attorney, Agent, or Firm* — Fish & Richardson P.C.

(57) ABSTRACT

In a wireless communication system of the present invention, a user equipment (UE) can receive mapping information for each of a plurality of connection categories. The UE can receive barring information for the plurality of connection categories. The UE can determine whether to perform a connection attempt to a network on the basis of the barring information and a connection category to which UE data belongs according to the mapping information.

15 Claims, 13 Drawing Sheets

(51) Int. Cl.
*H04W 16/02* (2009.01)
*H04W 48/14* (2009.01)

(56) References Cited

U.S. PATENT DOCUMENTS

| | | | |
|---|---|---|---|
| 2012/0281531 A1* | 11/2012 | Susitaival | H04W 48/06 370/230 |
| 2015/0036489 A1 | 2/2015 | Rajadurai et al. | |
| 2015/0111520 A1 | 4/2015 | Hsu | |
| 2018/0262980 A1* | 9/2018 | Jeong | H04W 8/04 |

FOREIGN PATENT DOCUMENTS

| | | |
|---|---|---|
| KR | 1020150008387 | 1/2015 |
| WO | WO2012150548 | 11/2012 |
| WO | WO2016006948 | 1/2016 |
| WO | WO2016076606 | 5/2016 |

OTHER PUBLICATIONS

PCT International Search Report and Written Opinion in International Appln. No. PCT/KR2017/008327, dated Oct. 30, 2017, 21 pages (with English translation).

Extended European Search Report in European Application No. 17837236.3, dated Feb. 13, 2020, 13 pages.

Huawei, "RAN configuration of network slices," R3-161135, RAN WG3 Meeting #92, Nanjing, China, dated May 23-27, 2016, 5 pages.

Japanese Office Action in Japanese Application No. 2019-505455, dated Jan. 7, 2020, 6 pages (with English translation).

\* cited by examiner (a) UE-P-GW user plane with E-UTRAN (b) Control Plane UE-MME

CONNECTION TRY METHOD AND USER EQUIPMENT, AND CONNECTION CONTROL METHOD AND BASE STATION

CROSS-REFERENCE TO RELATED APPLICATIONS

This application is a National Stage application under 35 U.S.C. § 371 of International Application No. PCT/KR2017/008327, filed on Aug. 2, 2017, which claims the benefit of U.S. Provisional Application No. 62/372,811, filed on Aug. 10, 2016, and U.S. Provisional Application No. 62/369,766, filed on Aug. 2, 2016. The disclosures of the prior applications are incorporated by reference in their entirety.

TECHNICAL FIELD

The present invention relates to a wireless communication system and, more particularly, to a method and apparatus for attempting to perform access to a network and a method and apparatus for controlling the access.

BACKGROUND ART

Wireless communication systems have been widely deployed to provide various types of communication services such as voice or data. In general, the wireless communication system corresponds to a multiple access system capable of supporting communication between multiple users by sharing available system resources (e.g., bandwidth, transmission power, etc.). For example, the multiple access system includes a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication. Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of smart devices, a new method of efficiently transmitting/receiving small volumes of data or efficiently transmitting/receiving data generated with a low frequency is needed.

In addition, with introduction of a network function, a method of efficiently controlling access to a network by UEs is needed.

Furthermore, a method of providing different access opportunities according to types and services of UEs and simultaneously providing a fair opportunity to UEs through minimum system load is needed.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of attempting to access a network by a user equipment (UE) in a wireless communication system. The method includes: receiving mapping information for each of a plurality of access categories; receiving barring information for the plural access categories; and determining whether to perform an access attempt to the network, based on an access category to which data of the UE belongs according to the mapping information and on the barring information.

According to another aspect of the present invention, provided herein is a user equipment (UE) for attempting to access a network in a wireless communication system. The UE includes a radio frequency (RF) unit, and a processor configured to control the RF unit. The processor is configured to: control the RF unit to receive mapping information for each of a plurality of access categories; control the RF unit to receive barring information for the plural access categories; and determine whether to perform an access attempt to the network, based on an access category to which data of the UE belongs according to the mapping information and on the barring information.

According to another aspect of the present invention, provided herein is a method of controlling, by a base station, access to a network performed by a user equipment (UE) in a wireless communication system. The method includes: transmitting mapping information for each of a plurality of access categories; transmitting barring information for the plural access categories; and receiving a request for access to the network from the UE.

According to another aspect of the present invention, provided herein is a base station for controlling access to a network performed by a user equipment (UE) in a wireless communication system. The base station includes a radio frequency (RF) unit, and a processor configured to control the RF unit. The processor is configured to: control the RF unit to transmit mapping information for each of a plurality of access categories; control the RF unit to transmit barring information for the plural access categories; and control the RF unit to receive a request for access to the network from the UE.

In each aspect of the present invention, the mapping information may indicate a network slice, an Internet protocol (IP) address, or an access cause, for each of the plural access categories.

In each aspect of the present invention, the plural access categories may include an access category for access which does not match any mapping criterion.

In each aspect of the present invention, the mapping information may indicate a network slice, an Internet protocol (IP) address, an access cause, or an access class, for each of the plural access categories.

In each aspect of the present invention, when access for the access category to which the data belongs is allowed, the access attempt may be performed and, when the access is not allowed, the access attempt may not be performed.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, network access by a UE may be controlled efficiently.

According to the present invention, different access opportunities can be provided according to types and services of UEs. In addition, according to the present invention, a fair access opportunity can be provided to UEs through minimum system load.

According to the present invention, uplink/downlink signals can be efficiently transmitted/received. Therefore, overall throughput of a radio communication system can be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
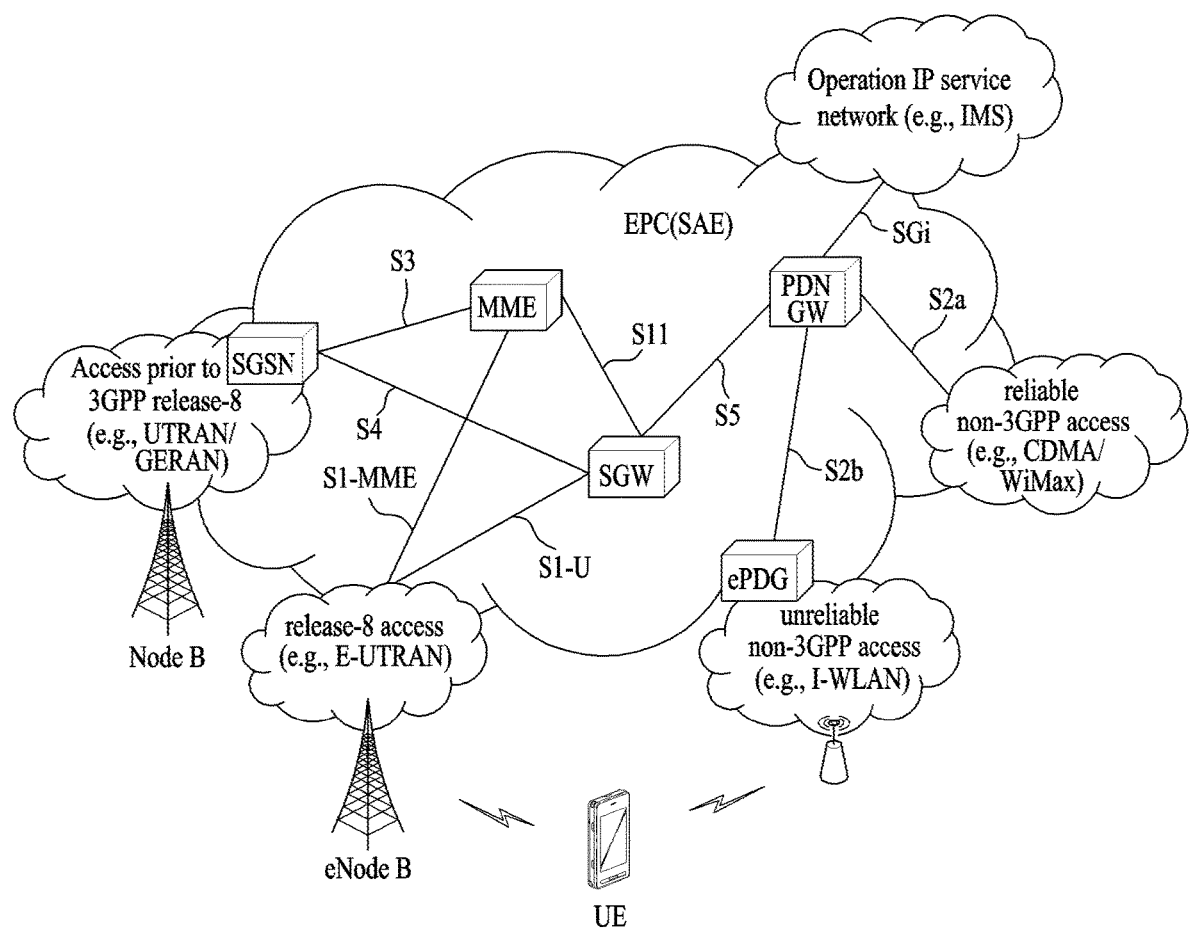
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, 3GPP TS 24.301, 3GPP TS 23.228, 3GPP TS 29.228, 3GPP TS 23.218, 3GPP TS 22.011, 3GPP TS 36.413 and 3GPP TS 23.303 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC devic.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
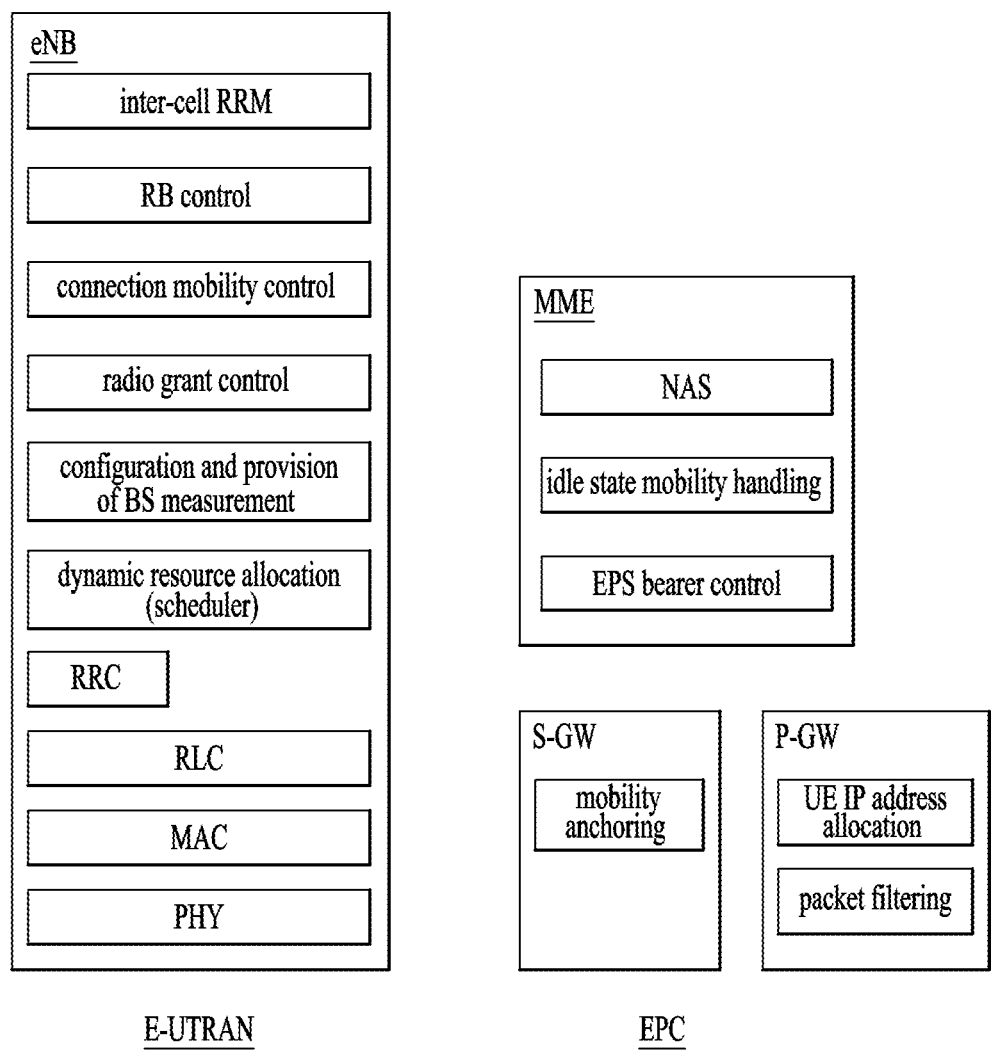
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
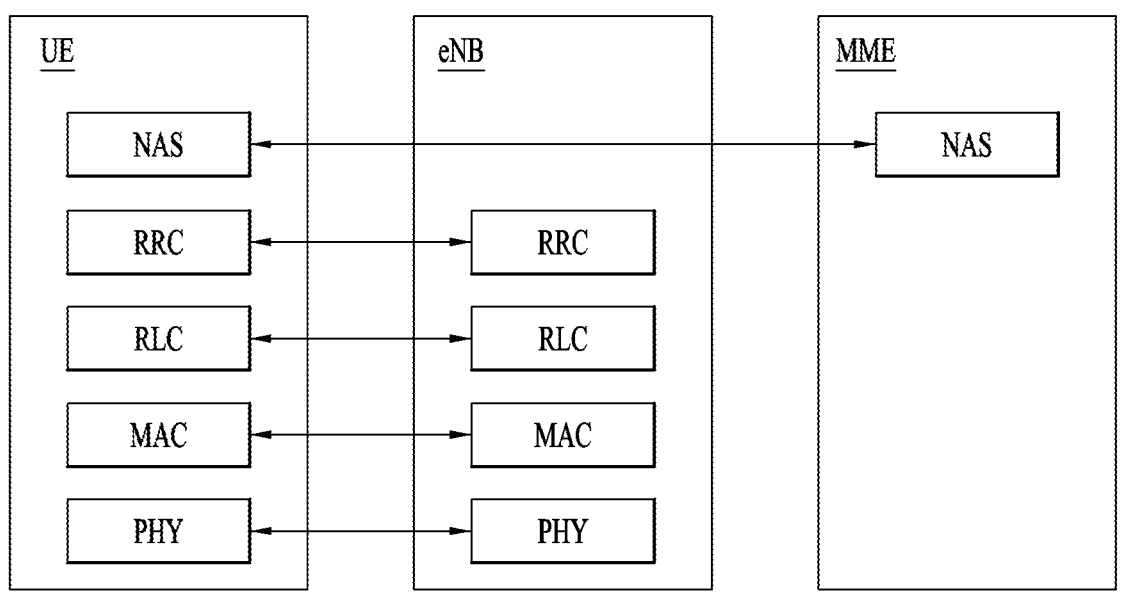
FIG. 3 is a diagram exemplarily illustrating the structure of a radio interface protocol in a control plane.
Figure 4:
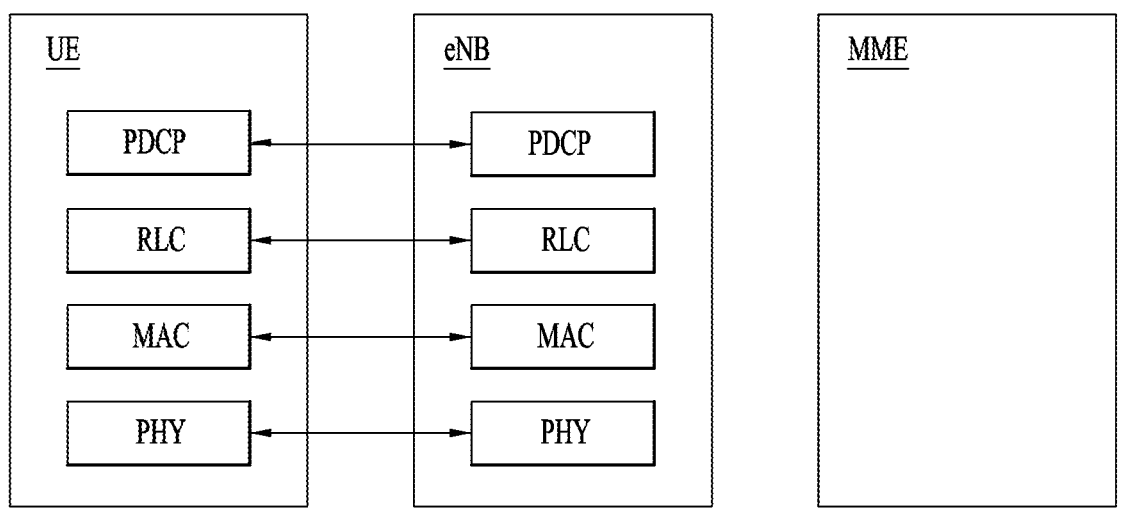
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish an RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. A default bearer resource is assigned from the network during initial access to a specific Packet Data Network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
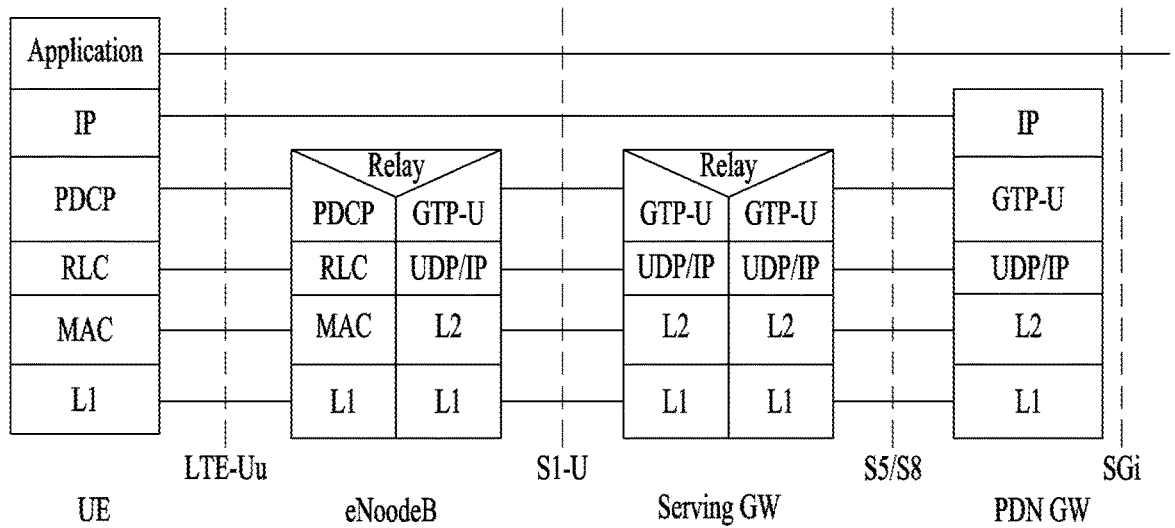
FIG. 5 is a diagram illustrating LTE (Long Term Evolution) protocol stacks for a user plane and a control plane.
Figure 5:
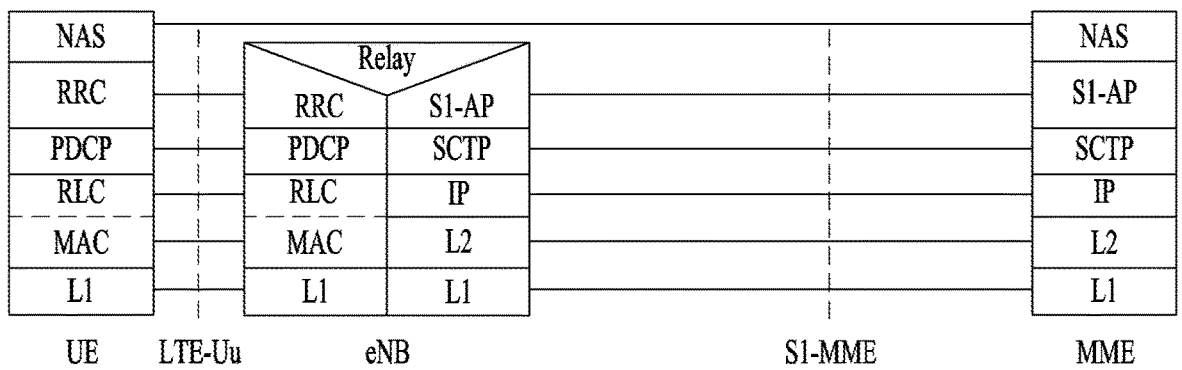

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
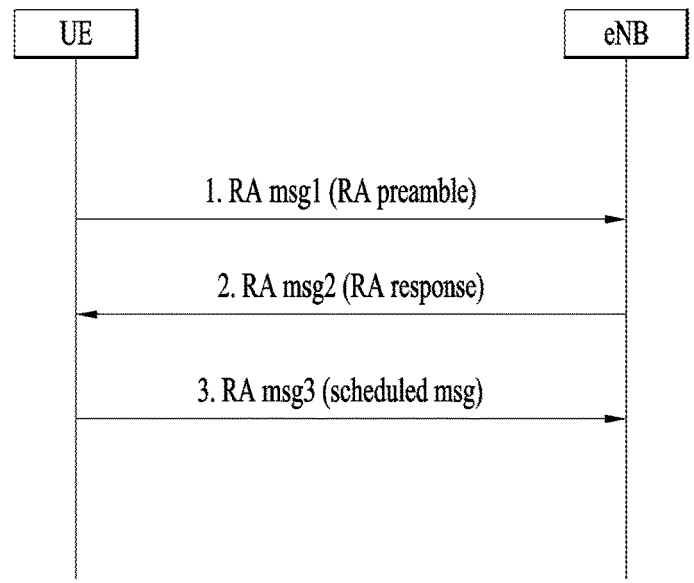
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
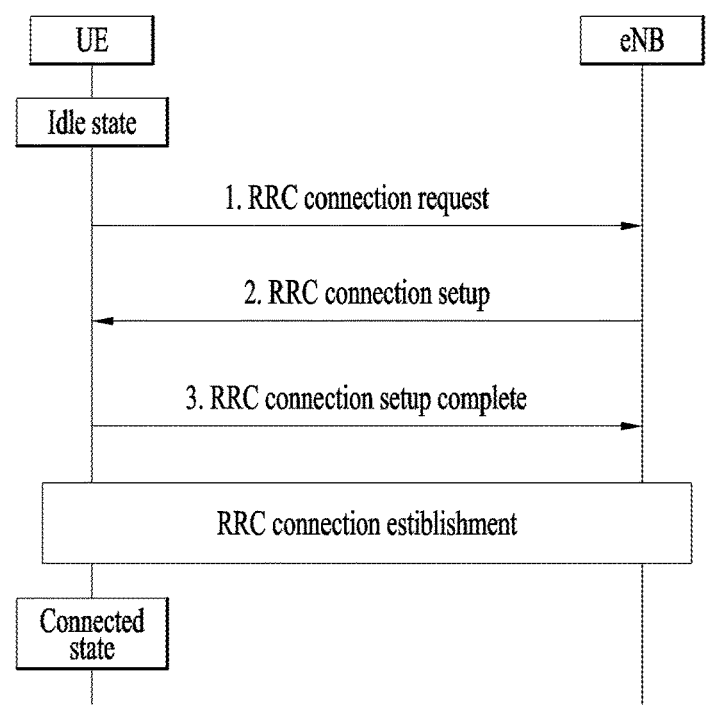
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

Figure 8:
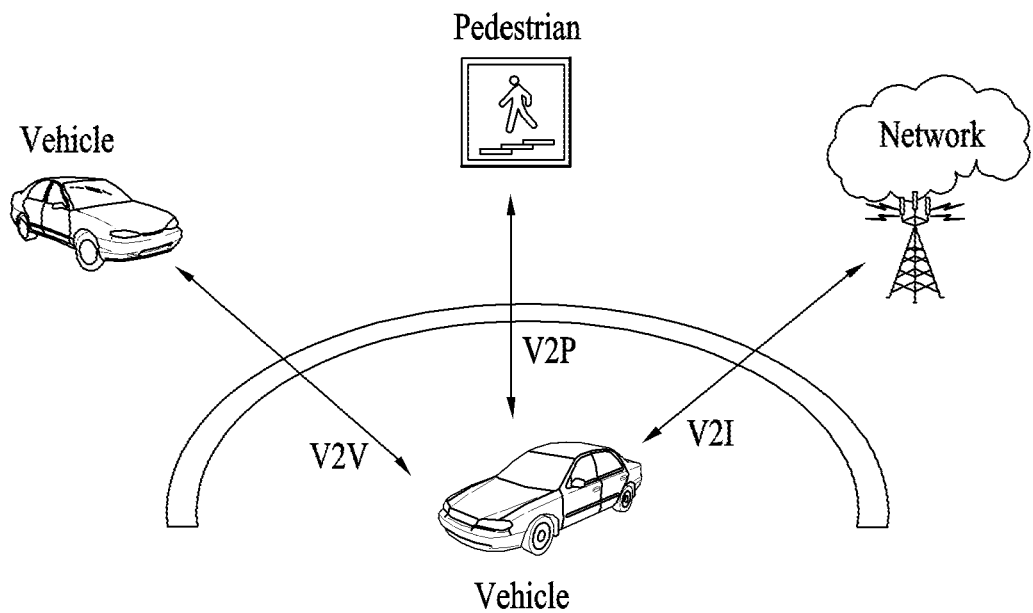
FIG. 8 is a diagram illustrating a vehicle-to-everything (V2X) communication environment.

FIG. 8 is a diagram illustrating a vehicle-to-everything (V2X) communication environment.

If a vehicle accident happens, significant injury and property damage may occur. Therefore, demand for technology capable of guaranteeing safety of pedestrians as well as safety of people riding in a vehicle is increasing. Thus, technology based on hardware and software specialized for a vehicle has been incorporated into the vehicle. LTE based V2X communication technology evolved from 3GPP shows a trend of incorporating information technology (IT) into the vehicle. A connectivity function is being applied to some vehicle models and a study supporting vehicle-to-vehicle (V2V) communication, vehicle-to-infrastructure (V2I) communication, vehicle-to-pedestrian (V2P) communication, and vehicle-to-network (V2N) communication has continued due to evolution of a communication function.

According to V2X communication, a vehicle continues to broadcast information about the location, velocity, and direction thereof. Adjacent vehicles that have received the broadcast information use the information for the purpose of preventing an accident by recognizing movement of vehicles thereabound. That is, similar to the case in which a person possesses a UE such as a smartphone or a smartwatch, a vehicle may also have a UE of a specific type mounted therein. In this case, the UE mounted in the vehicle is a device to which a communication network actually provides a communication service. For example, the UE mounted in the vehicle may be connected to an eNB in an E-UTRAN and receive a communication service. However, there are many considerations to implement V2X communication in the vehicle because astronomical costs are consumed to install traffic safety infrastructure such as a V2X eNB. That is, in order to support V2X communication on all roads on which vehicles can move, hundreds of thousands of V2X eNBs should be installed. In addition, each network node accesses the Internet or a central control server on a wired network basis for the purpose of stable communication with a server, and installation and maintenance costs of the wired network are high.

To effectively support V2X in an LTE or EPS system, QoS optimized for data generated in a V2X application needs to be provided. The V2X application is established by the European telecommunications standards institute (ETSI) intelligent transport systems (ITS), or system architecture evolution (SAE).

For design of a next-generation mobile network system, for example, a 5G core network, 3GPP has defined service requirements through a study entitled services and markets technology enablers (SMARTER). In addition, system architecture 2 (SA2) is conducting a study on architecture for a next-generation system based on SMARTER. Hereinafter, requirements and architecture of the next-generation communication system considered in 3GPP will be described. A portion of considerations to be supported by architecture of the next-generation (hereinafter, NextGen) system are described below. The NextGen System:

Supports the new RAT(s), the Evolved E-UTRA, and non-3GPP access types. GERAN and UTRAN are not supported.

Supports unified authentication framework for different access systems.

Support multiple simultaneous connections of an UE via multiple access technologies.

Supports different means for reducing UE power consumption while UE is in periods with data traffic as well as in periods without data traffic.

Supports services that have different latency requirements between the UE and the Data Network.

Minimizes the signaling (and delay) required to start the traffic exchange between the UE and the Data Network, i.e., signaling overhead and latency at transition from a period where UE has no data traffic to a period with data traffic.

Supports access to applications (including 3rd party applications) with low latency requirements hosted close to the access network within the operator trust domain.

Supports optimized mechanisms to control (includes avoiding) signaling congestion.

Provides efficient network support for a large number of UEs in periods without data traffic.

Supports network sharing.

Supports network slicing.

Minimizes energy consumption in the overall network operation.

Figure 9:
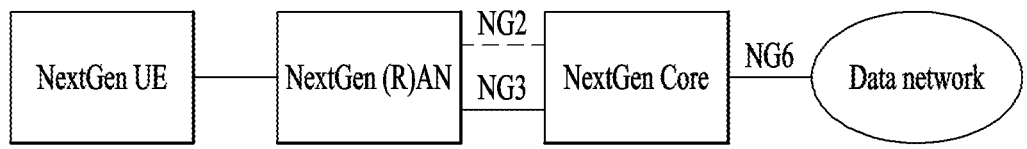
FIG. 9 illustrates a high-level architecture capable of being used as a reference model for a next-generation (NextGen) system.

FIG. 9 illustrates a high-level architecture capable of being used as a reference model for a NextGen system. Particularly, FIG. 9 illustrates a NextGen UE, a NextGen (R)AN, a NextGen core, and reference points thereof.

In FIG. 9, NG2 is a reference point for a control plane between the NextGen (R)AN and the NextGen core, NG3 is a reference point for a user plane between the NextGen (R)AN and the NextGen core, NG1 is a reference point for a control plane between the NextGen UE and the NextGen core, and NG6 is a reference point between the NextGen core and a data network. The data network may be an operator external public or private data network or an intra-operator data network. This reference point corresponds to SGi for 3GPP access.

Hereinafter, network slicing which is being considered in the NextGen system will be described. Network slicing enables the operator to create networks customized to provide optimized solutions for different market scenarios which demands diverse requirements, e.g. in the areas of functionality, performance and isolation. One key concept to achieve the goal of flexibility is network slicing. Network slicing allows the operator to provide dedicated logical networks with customer specific functionality, without losing the economies of scale of a common infrastructure. It allows services to be abstracted from the network resources. As such, a variety of use cases with diverging requirements can be fulfilled. For example, there will be different requirements on functionality such as charging, policy control, security, mobility etc. The use cases may also have differences in performance requirements e.g., lower latency, higher mobility and higher data rate. There may be also a need to isolate the different slices from each other. Terminals can be directed to appropriate network slices at the same time in ways that fulfill operator or user needs, e.g., based on subscription, traffic (e.g., voice, data), or terminal type. Typically a set of end-user services are provided by one network slice of a mobile network operator. Some UEs can access more than one network slice simultaneously for services of more diverse characteristics, e.g., MBB and critical communication. When accessing more than one network slice simultaneously, the operator may choose to not duplicate certain signalling procedures. Network slices consists of mainly 3GPP defined functions but could also include proprietary functions that are provided by different operators or 3rd parties. To guarantee a consistent user experience and support of services in case of roaming, slices composed of the same network functions are available for the user in the VPLMN. Configuration of network slices and provisioning of proprietary functions will be based on agreements between operators. Network slicing could also be used to provide a network configuration enabling basic communications (e.g., voice, text messages) in case of natural disasters. Another example of applying this concept could be to provide access to the network in markets where there is a need for providing access to essential services with a basic Internet access (e.g., basic broadband speeds, relaxed latency requirements). An operator often provides similar service to multiple 3rd parties (e.g., enterprises) that require similar network functionalities, which should be supported in an efficient manner.

Massive mobile data traffics have been generated in a mobile communication network for recent several years due to the development and fast market penetration of smartphones, and a communication traffic type has been remarkably changed from the legacy peer-to-peer communication to communication in which applications perform signal exchange autonomously. In a mobile communication system of high speed and high capacity, traffic congestion control is important in maintaining service stability in various statuses. Also, when a major disaster such as a big earthquake is generated, a mobile data traffic may be increased to an unexpected level and the network may be operated in error. Therefore, the mobile communication system needs a mechanism for preventing an unexpected high traffic from occurring before the unexpected high traffic is generated. To make sure of successful communication for emergency call and/or disaster board, a traffic congestion control mechanism is required to reduce a call which is not important/has a low priority to allow network resources for a call which is important/has a high priority to be available for many users if possible. In 3GPP, a series of traffic congestion mechanisms have been standardized to control mobile communication access for a network. One access control mechanism standardized as a part of 3G (UMTS) specifications and widely used in LTE is referred to as "access class (AC)" which is a control technology which uses priority identifier data stored in the UE. Hereinafter, a legacy access control mechanism will be described in more detail.

Under certain circumstances, it could be desirable to prevent UE users from making access attempts (including emergency call attempts) or responding to pages in specified areas of a PLMN. Such situations may arise during states of emergency, or where 1 of 2 or more co-located PLMNs has failed. Broadcast messages are available on a cell by cell basis indicating the class(es) or categories of subscribers barred from network access. The use of these facilities could allow the network operator to prevent overload of the access channel under critical conditions. It is not intended that access control be used under normal operating conditions. It should be possible to differentiate access control between CS and PS domains. Details on the existing access control are specified in 3GPP TS 23.122 and 3GPP TS 25.304. Not all RATs need to support access control functionality.

All UEs are randomly allocated one of Access Classes 0 to 9, and the allocated Access Class value is stored in the SIM/USIM. In addition, UEs may be members of one or more out of 5 special categories (Access Classes 11 to 15), also held in the SIM/USIM. These are allocated to specific high priority users as follows (the following enumeration is not meant as a priority sequence):

Access Class 15: PLMN Staff;
Access Class 14: Emergency Services;
Access Class 13: Public Utilities (e.g. water/gas suppliers);
Access Class 12: Security Services;
Access Class 11: For PLMN use.

Access control used in a current LTE/EPS system is based on access class barring (ACB) on the basis of an access control method which has been used in UMTS and GSM systems, which are legacy systems of the LTE/EPS system. As standardization is in progress, new mechanisms based on ACB, for example, service specific access control, access control for circuit switched fallback (CSFB), extended access barring (EAB), application specific access control, emergency calls, and prevention of mobile originating signaling and/or data traffic, have been added to access control mechanisms used in the current LTE/EPS system. Hereinafter, access control mechanisms used in a legacy LTE/EPS system will be described.

Access Class Barring (ACB)

If the UE is a member of at least one Access Class which corresponds to the permitted classes as signaled over the air interface, and the Access Class is applicable in the serving network, access attempts are allowed. Additionally, in the case of the access network being UTRAN the serving network can indicate that UEs are allowed to respond to paging and perform location registration, even if their access class is not permitted. Otherwise access attempts are not allowed. Otherwise access attempts are not allowed. Also, the serving network can indicate that UEs are restricted to perform location registration, although common access is permitted. If the UE responded to paging it shall follow the normal defined procedures and react as specified to any network command. Access Classes are applicable as follows:

Access Classes 0~9: Home and Visited PLMNs;
Access Classes 11 and 15: Home PLMN only if EHPLMN (equivalent Home PLMN) list is not present or any EHPLMN, or any EHPLMN;
Access Classes 12, 13, 14: Home PLMN, and visited PLMNs (VPLMNs) belonging to the same home country. For this purpose the home country is defined as the country of the mobile country code (MCC) part of the IMSI.

Any number of these classes may be barred at any one time. In the case of multiple core networks sharing the same access network, the access network is able to apply Access Class Barring for the different core networks individually. The following is the requirements for enhanced Access control on E-UTRAN.

The serving network shall be able to broadcast mean durations of access control and barring rates (e.g. percentage value) that commonly applied to Access Classes 0-9 to the UE. The same principle as in UMTS is applied for Access Classes 11-15.

E-UTRAN shall be able to support access control based on the type of access attempt (i.e. mobile originating data or mobile originating signaling). E-UTRAN shall be able to form combinations of access control based on the type of access attempt (e.g. mobile originating and mobile terminating, mobile originating, or location registration). The 'mean duration of access control' and the barring rate are broadcasted for each type of access attempt (i.e. mobile originating data or mobile originating signaling).

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed. Otherwise, the access attempt is not allowed. If the access attempt is not allowed, further access attempts of the same type are then barred for a time period that is calculated based on the 'mean duration of access control' provided by the network and the random number drawn by the UE.

The serving network shall be able to indicate whether or not a UE shall apply Access Class Barring for SMS access attempts in SMS over SGs, SMS over IMS (SMS over IP), and SMS over S102. This indication is valid for Access Classes 0-9 and 11-15.

The serving network shall be able to indicate whether or not a UE shall apply Access Class Barring for multimedial telephony (MMTEeL) voice access attempts. This indication is valid for Access Classes 0-9 and 11-15.

The serving network shall be able to indicate whether or not a UE shall apply Access Class Barring for MMTeL video access attempts. This indication is valid for Access Classes 0-9 and 11-15.

Service Specific Access Control

Additionally to the requirements described in the clause of ACB, in E-UTRAN, access control shall be possible to support a capability called Services Specific Access Control (SSAC) to apply independent access control for telephony services (MMTeL) for mobile originating session requests from idle-mode and connected-mode as following.

The serving network shall be able to indicate (as specified above in the clause of ACB) whether or not a UE subject to SSAC shall also apply Access Class Barring.

EPS shall provide a capability to assign a service probability factor and mean duration of access control for each of MMTeL voice and MMTeL video:

assign a barring rate (percentage) commonly applicable for Access Classes 0-9.

assign a flag barring status (barred/unbarred) for each Access Class in the range 11 -15.

SSAC shall not apply to Access Class 10.

SSAC can be provided by the VPLMN based on operator policy without accessing the HPLMN.

SSAC shall provide mechanisms to minimize service availability degradation (i.e. radio resource shortage) due to the mass simultaneous mobile originating session requests and maximize the availability of the wireless access resources for non-barred services.

The serving network is able to broadcast mean durations of access control, barring rates for Access Classes 0-9, barring status for Access class in the range 11-15 to the UE.

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' provided by the network and the random number drawn by the UE.

Access Control for CSFB

Access Control for CSFB provides a mechanism to prohibit UEs to access E-UTRAN to perform CSFB. It minimizes service availability degradation (i.e. radio resource shortage, congestion of fallback network) caused by mass simultaneous mobile originating requests for CSFB and increases the availability of the E-UTRAN resources for UEs accessing other services. When an operator determines that it is appropriate to apply access control for CSFB, the network may broadcast necessary information to provide access control for CSFB for each class to UEs in a specific area. The network is able to separately apply access control for CSFB, SSAC and enhanced Access control on E-UTRAN.

The following requirements apply for CSFB to 1×RTT: In E-UTRAN, the network may apply access control for mobile originating session requests on CSFB from 1×RTT/E-UTRAN UE, The parameters received by the UE are dealt with in accordance with CDMA2000 procedures in 3GPP2 C.S0004-A: "Signaling Link Access Control (LAC) Standard for cdma2000 Spread Spectrum Systems—Addendum 2".

For CSFB to UTRAN or GERAN, the necessary information in the broadcast to provide access control for CSFB is the same as that specified above in the clause of ACB. In addition to those requirements the following apply:

Access control for CSFB applies for Access Class 0-9 and Access Class 11-15. It shall not apply for Access Class 10.

Access control for CSFB is applied for idle mode UE.

Access control for CSFB applies to all CSFB services.

Access control for CSFB may be provided by the VPLMN based on operator policy without accessing the HPLM.

If Access control for CSFB, according to the UE's access class, disallows originating session requests for CSFB then a UE does not send mobile originating session requests for CSFB.

If Access control for CSFB is applied by the UE for a mobile originating session request for CSFB, the UE bypasses enhanced Access control on E-UTRAN for that session.

The criteria on which a UE determines whether Access control for CSFB allows or disallows originating session requests for CSFB are equivalent to those for enhanced Access control on E-UTRAN, as described in the clause of ACB.

If access is not granted for the UE, mobile originating session requests for CSFB are restricted for a certain period of time to avoid overload of E-UTRAN due to continuous mobile originating session requests from the same UE. The duration of the period is determined using the same operation used in ACB.

In case the network does not provide the Access control for CSFB information, the UE shall be subject to access class barring for Access Classes 0-9 and 11-15 as described in the clause of ACB.

Extended Access Barring (EAB)

EAB is a mechanism for the operator(s) to control Mobile Originating access attempts from UEs that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area. The following requirements apply for EAB:

The UE is configured for EAB by the HPLMN.

EAB shall be applicable to all 3GPP Radio Access Technologies.

EAB shall be applicable regardless of whether the UE is in a Home or a Visited PLMN.

A network may broadcast EAB information.

EAB information defines whether EAB applies to UEs within one of the following categories: a) UEs that are configured for EAB, b) UEs that are configured for EAB and are neither in their HPLMN nor in a PLMN that is equivalent to it, c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

EAB information also includes extended barring information for Access Classes 0-9.

A UE configured for EAB uses its allocated Access Class(es), when evaluating the EAB information that is broadcast by the network, in order to determine if its access to the network is barred.

If a UE that is configured for EAB initiates an emergency call or is a member of an Access Class in the range 11-15 and according to ACB that Access Class is permitted by the network, then the UE ignores any EAB information that is broadcast by the network.

If the network is not broadcasting the EAB information, the UE is subject to access barring as described in the clause of ACB.

If the EAB information that is broadcast by the network does not bar the UE, the UE shall be subject to access barring as described in the clause of ACB.

In the case of multiple core networks sharing the same access network, the access network shall be able to apply the EAB for the different core networks individually.

Overriding Extended Access Barring is a mechanism for the operator to allow UEs that are configured for EAB to access the network under EAB conditions. The following requirements apply.

The UE configured with EAB may be configured by the HPLMN with a permission to override EAB.

For a UE configured with the permission to override EAB, the user or application (upper layers in UE) may request the UE to activate PDN connection(s) for which EAB does not apply.

The UE overrides any EAB restriction information that is broadcast by the network as long as it has an active PDN connection for which EAB does not apply.

Application specific Congestion control for Data Communication (ACDC)

Application specific Congestion control for Data Communication (ACDC) is an access control mechanism for the operator to allow/prevent new access attempts from particular, operator-identified applications in the UE in idle mode. ACDC does not apply to UEs in connected mode. The network can prevent/mitigate overload of the access network and/or the core network. This feature is optional. The following requirements apply:

This feature is applicable to UTRAN PS Domain and E-UTRAN.

This feature is applicable to UEs in idle mode only that are not a member of one or more of Access Classes 11 to 15.

ACDC does not apply to MMTEL voice, MMTEL video and SMS over IMS (SMS over IP) services.

The home network is able to configure a UE with at least four and a maximum of sixteen ACDC categories to each of which particular, operator-identified applications are associated.

The serving network is able to broadcast, in one or more areas of the RAN, control information, indicating barring information per each ACDC category, and whether a roaming UE shall be subject to ACDC control. The barring information may be similar to ACB information, and include mean durations of access control (i.e., barring timer) and barring rates (i.e., percentage value). If the barring timer is running due to a previous access attempt from an application in a certain given matched ACDC category, the UE may only allow access attempts from applications in higher ACDC categories (according to the corresponding barring information for those higher categories). If the barring timer is running due to a previous access attempt from an application in a certain given unmatched ACDC category or a uncategorized application, the UE may only allow access attempts from applications in higher ACDC categories than the lowest ACDC category broadcast (according to the corresponding barring information for those higher categories).

The UE is able to control whether or not an access attempt for a certain application is allowed, based on this broadcast barring information and the configuration of ACDC categories in the UE.

The serving network is able to simultaneously indicate ACDC with other forms of access control.

When both ACDC and ACB controls are indicated, ACDC overrides ACB.

If a UE is configured for both EAB and ACDC, and the serving network simultaneously broadcasts EAB information and ACDC barring information:

If the UE determines as described in the clause of EAB that access to the network is not barred or as described in the clause of overriding EAB that it is permitted to override an EAB restriction, then access to the network is subject to ACDC.

If the UE determines as specified in the clause of EAB that access to the network is barred and as specified in the clause of overriding EAB that it is not permitted to override the EAB restriction, then access to the network is barred.

In the case of multiple core networks sharing the same access network, the access network is able to apply ACDC for the different core networks individually. For the mitigation of congestion in a shared RAN, barring rates are set equal for all participating operators.

When configuring the UE with categories of applications, the home network proceeds as follows:

Applications whose use is expected to be restricted the least are assigned the highest ACDC category; and Applications whose use is expected to be restricted more than applications in the highest category are assigned the second-to-highest ACDC category, and so on; and Applications whose use is expected to be restricted the most shall either be assigned the lowest ACDC category, or not be categorized at all.

For a UE with ACDC categories configured, the applications on the UE that are not assigned to any ACDC category are treated by the UE as part of the lowest ACDC category broadcast by the serving network. If the operator requires differentiation with respect to these uncategorized applications, the operator avoids assigning applications to the lowest ACDC category. When applying ACDC, the serving network broadcasts barring information starting from the highest to the lowest ACDC category. The home network and the serving network may use different categorization. The serving network determines if ACDC applies to roaming UEs.

The number of ACDC categories in the UE may not be the same as the number of ACDC categories broadcast by the serving network. This may happen, e.g. when the UE is roaming and the number of categories broadcast by the serving network is different from the home network. Therefore the following rules may apply:

If the serving network broadcasts more ACDC categories than the UE's configuration, the UE uses barring information for the matching ACDC category, and bars uncategorized applications using the barring information for the lowest category broadcast by the serving network, and ignores barring information for unmatched categories.

If the serving network broadcasts barring information for fewer ACDC categories than the UE's configuration, the UE uses barring information for the matching ACDC category and bars other applications using the barring information for the lowest category broadcast by the serving network. A matching ACDC category is an ACDC category for which barring information is broadcast by the serving network and that has the same rank as the rank of a configured ACDC category in the UE. An unmatched ACDC category is either an ACDC category for which barring information is broadcast by the serving network but with no corresponding ACDC category configured in the UE, or an ACDC category configured in the UE but with no corresponding barring information broadcast by the serving network.

Emergency Calls

An additional control bit known as "Access Class 10" is also signaled over the air interface to the UE. This indicates whether or not network access for Emergency Calls is allowed for UEs with access classes 0 to 9 or without an IMSI. For UEs with access classes 11 to 15, Emergency Calls are not allowed if both "Access class 10" and the relevant Access Class (11 to 15) are barred. Otherwise, Emergency Calls are allowed.

Multimedia Priority Service

Multimedia Priority Service (see 3GPP TS 22.153) is assigned its own unique access class value (i.e., one of the special access classes 11 to 15). The assigned access class value for Multimedia Priority Service is based on regional/national regulatory requirements and operator policy.

Control of UE Capabilities

To protect the user from the effects of a misbehaving UE (e.g. causing additional charges, degraded performance) and to protect the network operator's network capacity, including radio resources and network signaling and processing, means shall be provided for the HPLMN/EHPLMN and the VPLMN to provide an indication to the UE as to which network provided services or functions it is not allowed to use. The Selective UE Capabilities list, shall be maintained in the UE and the UE shall not request any services indicated as disabled. At registration the HPLMN/EHPLMN or VPLMN may interrogate the status of the list and provide a new list. The Selective UE Capabilities list is not deleted at switch off and remains valid until a new list is provided by the network. The Selective UE Capabilities list relates to the mobile equipment (ME) and not to the subscription. It should be ensured that UEs are not maliciously disabled, including malicious disabling by a VPLMN, or accidentally disabled, or kept disabled, and there shall be a mechanism for restoring disabled UEs in all situations (e.g. in the case that the serving network does not support the control of UE Capabilities). The UE uses the indications given in the Selective UE Capabilities list to inform the user of the non-availability of services or functions. There shall be a means for the network to provide an optional customer service number(s) which can be used, by the user, to assist in determining the cause of non-availability of specific services. The specifications should also provide the capability for the network to include an optional text string that will be displayed by the UE. The UE Capabilities list takes precedence over subscribed services. The services to be included in the list are:

Call Control functions;
Supplementary Services;
Emergency Calls (including the (U)SIM-less case and subject to regional regulatory requirements, i.e. emergency calls shall not be disabled in regions where support of them is required));
SMS, via CS and PS;
LCS, via CS and PS;
GPRS based services;
MBMS;
IMS.

Prevention of Mobile-Originating Signaling and/or Data Traffic

The network is able to control the behavior of UEs in E-UTRAN in connected mode to prevent mobile originating signaling and/or data traffic, while the access barring mechanisms described under ACB, SSAC, Access Control for CSFB, EAB and ACDC are being applied to UEs in idle mode.

As described above, the access control mechanisms used in the current LTE/EPS system include SSAC, access control for CSFB, EAB, ACDC, emergency calls, and prevention of mobile originating and/or data traffic, which are added based on ACB, on the basis of a scheme which has been used in the UMTS and GSM systems, which are legacy systems of the LTE/EPS system. These mechanisms correspond to a scheme additionally applied to access control based on an access class. If data to be transmitted by a UE occurs, the UE checks an access control mechanism that the UE should perform among the access control mechanisms and determines whether the UE is allowed to attempt to access a network. If an access attempt is allowed, the UE further checks ACB. If the ACB check is finally passed, the UE actually transmits an RRC connection request to an eNB, thereby performing access attempts.

In the GSM/UMTS system, each UE has checked which access class the UE belongs to, based on access class information stored in a SIM card, and performed access attempts according to the checked result. For example, if an access class designated in the SIM of the UE is 1 and the eNB/network informs the UE that only access classes 5 and 9 are allowed to access the eNB/network, the UE cannot access the eNB/network. On the other hand, if the eNB/network informs the UE that access class 1 is also allowed to access the eNB/network, the UE may perform access to the eNB/network.

However, access control mechanisms which have been used in the GSM/UMTS system have serious defects. These defects occur in a congestion situation of the eNB. Operators will issue SIM cards to uniformly distribute all access classes in the SIM cards. For example, if any operator issued one million SIM cards, 100,000 SIM cards will have each of access class 0 to access class 9. In this situation, if any eNB permits access only to specific one access class at an interval of a predetermined time, sequentially from 0 to 9, in order to avoid a congestion situation, system information transmitted by the eNB to each UE should be updated at least 10 times in order to inform the UE of access class allowance information which is consistently updated. This means that any UE performs a system information update process a maximum of 10 times in order to actually access the network. Thereby, the UE causes waste of power and the eNB causes increase in complexity.

To solve these problems, the LTE system regards access classes 0 to 9 as the same pool, instead of controlling each of access classes 0 to 9, and applies a possibility value (i.e., barring rate) and a standby time (i.e., the mean duration of access control) value. That is, unlike the GSM/UMTS system which has used only one access class set in a SIM card of a UE, each UE of the LTE system selects a random value from among values 0 to 1 when the UE desires to access the eNB regardless of an access class thereof. Next, if the selected value is greater than the possibility value provided by the network, the UE performs access (attempts) and, if the selected value is less than the possibility value, the UE does not perform access (attempts). Using this method, each UE lessens the burden of information update management. This method, however, is problematic in that the same access control is applied even when differentiation is needed between UEs. For example, any operator desires to distinguish between specific users, i.e., users who pay high charges and users who pay low charges, by distinguishing between access classes. That is, access class 0 may be allocated to users who pay the highest charges and access class 9 may be allocated to users who pay the lowest charges. In this case, the fairest access control is to provide more opportunities to access class 0 than to access class 9. For example, a high possibility value may be allocated to access class 0. However, the access control mechanisms introduced in the LTE/EPS system have restricted such flexibility of an operator so that the UE cannot be provided with differentiated QoS.

Accordingly, the present invention proposes methods of assigning a fair access opportunity to UEs through minimum system overhead while providing different access opportunities according to types and services of UEs in a NextGen mobile communication system. Particularly, the present invention proposes that a mobile communication system flexibly allocate an access class/category to which each UE belongs to the UE, based on subscription information of the UE, information about an application used by the UE, and a network slice. The UE may determine access to the system based on the access class/category which is flexibly allocated.

Figure 10:
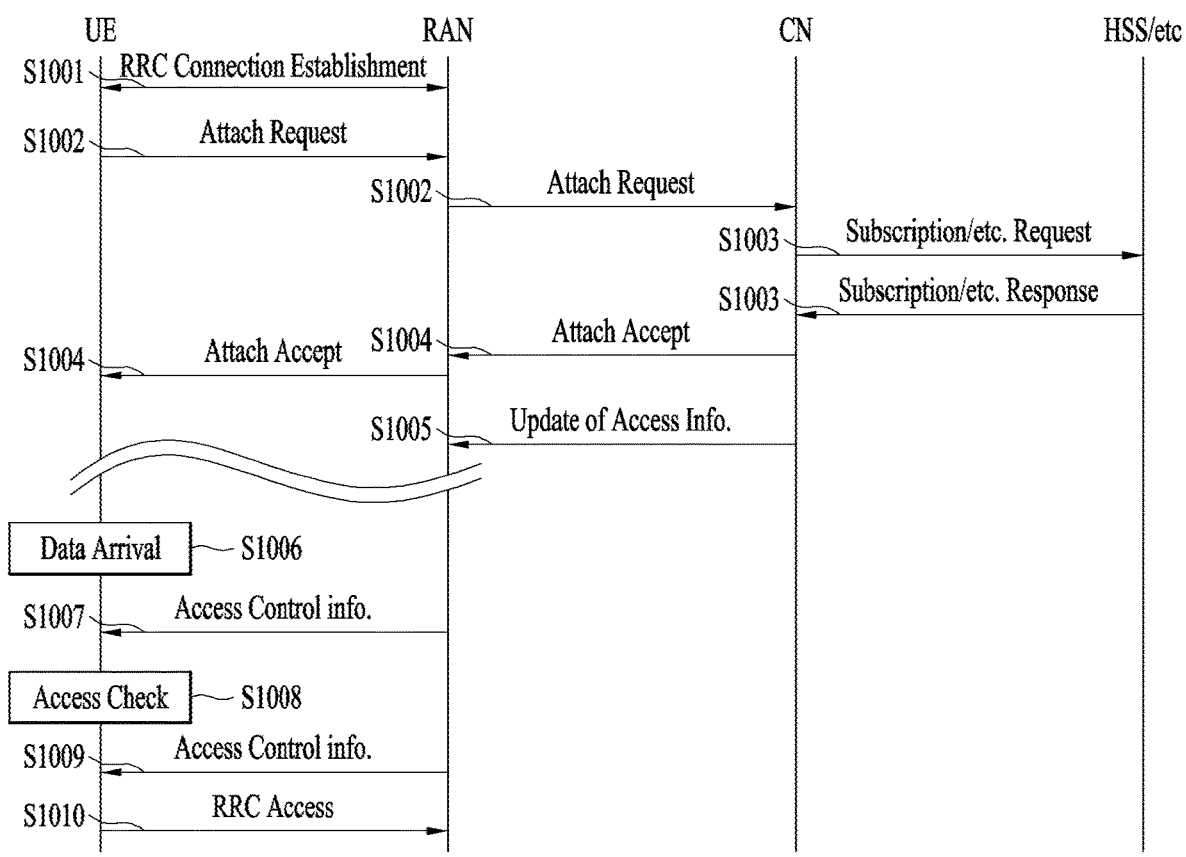
FIG. 10 illustrates an example of an access control mechanism according to the present invention.

FIG. 10 illustrates an example of an access control mechanism according to the present invention.

The present invention proposes that, when a UE accesses a network/eNB in order to register the UE to the network/eNB or to update the location of the UE, the eNB/network transmit access class information which is to be used by the UE to the UE and use the access class information in a process of accessing the eNB/network until the UE is provided with a new value. For example, the UE registers itself to the network through an attach procedure or a tracking area update procedure or through a procedure equivalent thereto. The network determines an access class which is to be allocated to the UE, using a variety of information including information about an area in which the UE is located, a service to which the UE has subscribed, and network slice information corresponding to the UE, and informs the UE of the determined access class.

S1001. After a UE is turned on, the UE tries to register itself to the network. To this end, the UE establishes RRC connection with an RAN.

S1002. If RRC connection is established, the UE transmits an attach request message to the network. The RAN may transfer information about a congestion situation of an area managed thereby in the process of transferring the attach request message received from the UE to a core network (CN).

S1003. Upon receiving the attach request message from the UE, the network transmits a request message for context information, such as subscription information of the UE, to an HSS.

The CN or the HSS may use information about a status of access classes allocated to an area in which the UE is located or exchange the information with each other. Alternatively, according to criteria managed by the network, the CN and the HSS may exchange information as to which access class should be allocated to the UE.

For example, the HSS contains information as to which access class value has been allocated to UEs having characteristics of the UE in a tracking area in which the UE has performed an access attempt. As an example, the network may determine to allocate access classes 1 and 2 to a smartphone and access class 3 to a smartwatch. This information is allocated to the CN or is managed by the HSS. Assuming that the UE is a smartphone, the CN may randomly select either access class 1 or 2, based on the above information, and determine to use the selected access class as the access class of the UE.

Alternatively, an access class may be allocated per network slice. For example, the network may allocate access class 5 to network slice 1 and access class 7 to network slice 2. If a network slice to which the UE has subscribed is 1, the network may determine to allocate access class 1 to the UE.

Instead of assigning access classes 0 to 15 regardless of the network and an operator, the number of access classes that can be used by each network/operator may be randomly determined. To distinguish between UEs used for a special purpose, an access class commonly designated to all operators may be defined. For example, all operators may commonly allocate access class 12 to a UE for a public service.

S1004. The network determines an access class which is to be allocated to the UE, based on the information described in step S1003, and transmits information about the access class to the UE (for example, through an access accept message). Hereinafter, for convenience of description, it is assumed that access class 1 is allocated to the UE. The UE stores the allocated access class value and uses the value to access the network until a new value is allocated.

S1005. The CN may transmit allocation information of an access class to the RAN. For example, the CN may provide distribution information indicating how many UEs are distributed for each access class to the RAN. The RAN may adjust the value of access control information transmitted by the RAN to the UE through a system information block (SIB), based on the distribution information. For example, the CN may transmit, to the RAN, information indicating that the number of UEs corresponding to access class 1 is 100 and the number of UEs corresponding to access 2 is 1000 in a corresponding area and information indicating that access class 1 has the same priority as access class 2. Based on this information, the RAN may determine that larger absolute access opportunities than those of the UEs corresponding to access class 1 by 10 times should be provided to the UEs corresponding to access class 2 because the number of the UEs corresponding to access class 2 is 10 times the number of the UEs corresponding to access class 1, in order to provide similar access opportunities to the UEs corresponding to access class 1 and the UEs corresponding to access class 2.

S1006. Data is generated from an application of the UE long after step S1004 is performed.

S1007. The UE checks latest system access information in order to determine whether or not to access the network for data transmission. For example, it is assumed that the access control information received in this step indicates that access class 1 is barred and only access class 2 is permitted.

S1008. According to the received access control information, the UE determines that network access thereby has been barred and does not attempt to access the eNB during a certain period of time.

S1009. After a certain criterion of time elapses, the UE receives the access control information from the network again. In this case, it is assumed that information indicating that access of access class 1 is allowed is received.

S1010. The UE determines that an access class thereof is allowed according to new access control. When necessary, the UE further performs a probability check. If it is determined that access is finally allowed, the UE attempts to access the eNB, i.e., the RAN.

Figure 11:
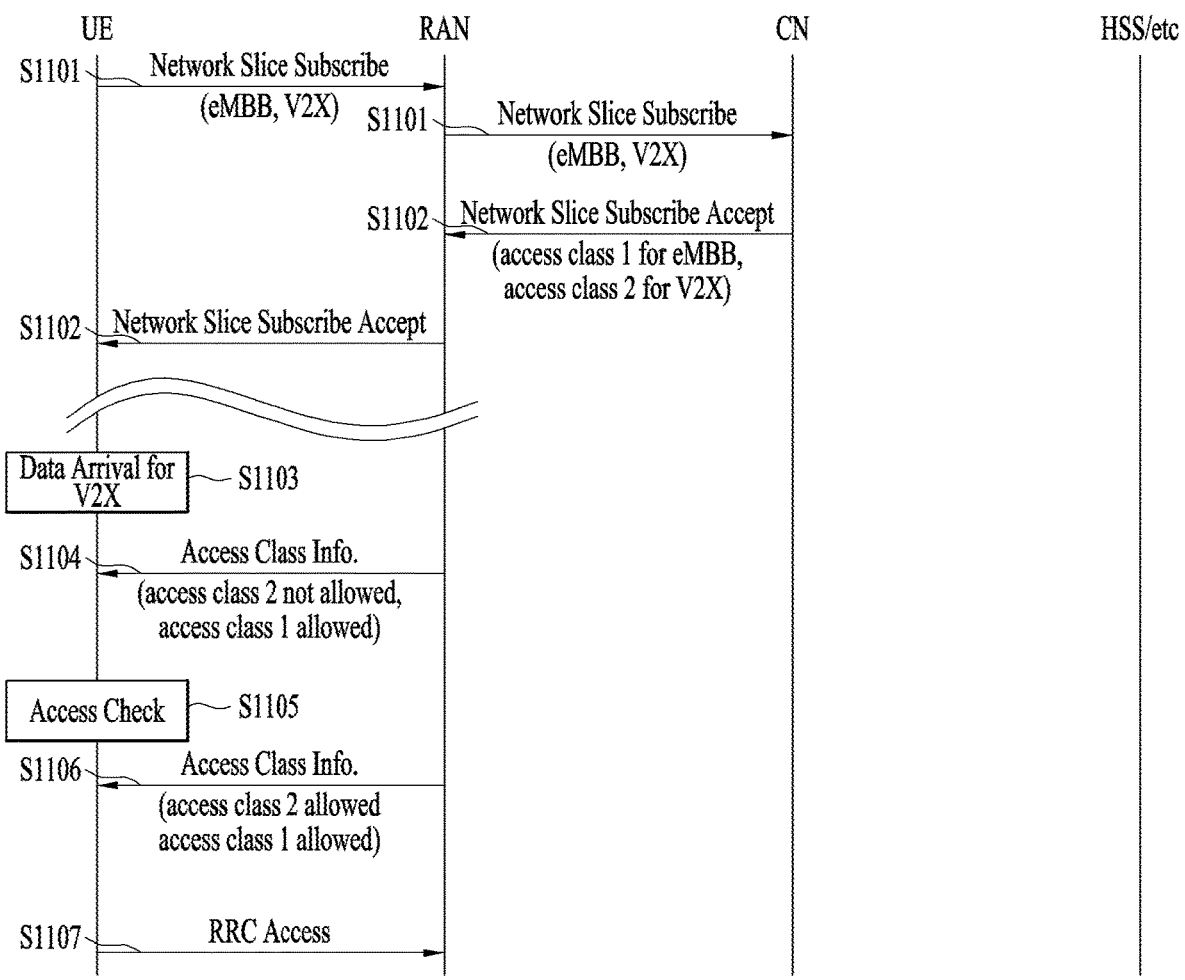
FIG. 11 illustrates another example of an access control mechanism according to the present invention.

FIG. 11 illustrates another example of an access control mechanism according to the present invention.

As compared with legacy UEs, it is expected that new UEs will use services having various characteristics and one UE will be used for various purposes. For example, any smartphone may be used for Internet access and browsing during the day time and may be used for security at night or for V2X in the interior of a vehicle. However, traffic for a security service, traffic for a normal Internet service, and traffic for a V2X service differ in properties and network stability. Therefore, it is expected that each service traffic will be processed by a different network slice. Hence, one UE will support a plurality of different network slices. In this case, the eNB/network will provide each service by use of a different network slice and, simultaneously, will differently set requirements and configurations of respective network slices. For example, since a network slice for security or V2X has an important effect on personal safety, it is better to maximally support access of a UE that desires to receive the security or V2X service even in a situation in which the network is lacking in resources. In this case, the network will try to maximally suppress access of a UE that attempts to perform normal Internet access relative to access of the UE that desires to receive the security or V2X service. Accordingly, the present invention proposes allocating a plurality of access classes to a UE in order to provide network access satisfying QoS to the UE in a situation in which different network slices are present. In the present invention, the network adds mapping information indicating which service of data or which network slice of data is mapped to which access class value, using service information of the UE. Upon attempting to access the network/eNB, the UE checks for which network slice or for application data has occurred, based on the mapping information, determines an access class related to the network slice or application, and then controls network access according to corresponding access control information.

S1101. A UE accesses a network to inform the network that the UE will use an eMBB slice and a V2X slice.

S1102. The network performs a configuration for providing an eMBB slice service and a V2X slice service to the UE, based on information received in step S1101. Additionally, for example, the network allocates access class 1 for the eMBB slice and access class 2 for the V2X slice to the UE.

Access class allocation of other types may be performed. For example, the network may inform the UE that access class 1 is used for application 1 and access class 2 is used for application 2. Alternatively, the network may inform the UE of which access class should be used according to an IP address.

S1103. Data is generated in an application corresponding to the V2X slice of the UE.

S1104. The UE receives access control information from an eNB. The access control information indicates that access for access class 1 is allowed and access for access class 2 is not allowed.

S1105. The UE checks whether data that the UE desires to transmit, i.e., access of an access class corresponding to the V2X network slice, is allowed, based on the access control information received in step S1104. For example, the UE determines that access is not allowed according to the access control information received in step S1104 and does not perform access.

S1106. The UE receives new access control information from the eNB. The access control information indicates that access for access class 1 is allowed and access for access class 2 is also allowed.

S1107. The UE performs access using possibility information corresponding to access class 2 and uses the V2X slice service.

In FIGS. 10 and 11, the present invention has been described by taking an example in which an access class is allocated per network slice. However, the access class may be divided based on each application or each IP address. The UE may directly receive information about the access class by accessing the network or may be aware of the information about the access class through an SIB transmitted by the network. The information about the access class may include, for example, information as to which network slice corresponds to which access class, information as to which application or which IP address corresponds to which access class, or information as to which service/access attempt corresponds to which access class according to other criteria. For example, information about which access class corresponds to a network slice may be indicated to the UE through an SIB. Alternatively, information as to whether access per network slice is allowed or not may be indicated to the UE through the SIB and the UE may operate according to this information. Alternatively, the network may inform the UE of information about to which network slice each application or each service flow should be mapped or information about to which access class each application or each service flow should be mapped.

In FIG. 11, for example, if the UE does not use the V2X slice any longer, the UE may inform the network of this fact and the network may allocate a new access class to the UE or retrieve a previous access class allocated for the V2X slice.

Figure 12:
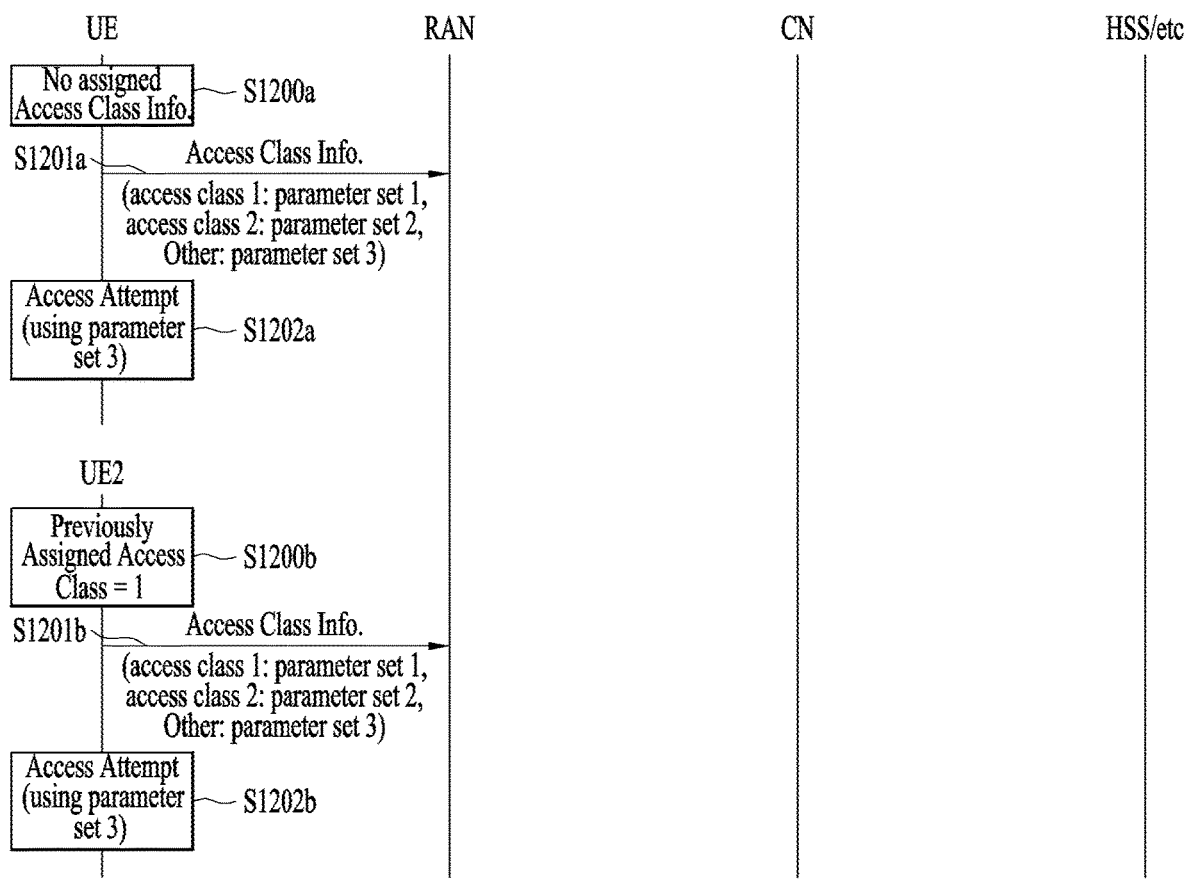
FIG. 12 illustrates another example of an access control mechanism according to the present invention.

FIG. 12 illustrates another example of an access control mechanism according to the present invention.

When a UE subscribes to any operator and then first performs access, or accesses a new network in a roaming process, the UE cannot perform a registration operation to the network, such as an attach procedure, because there is no allocated access class information. To solve this problem, the present invention proposes using a default value when the UE has no access class information preallocated from the network. For example, a different access control value (e.g., a mean duration of access control, a barring rate, etc.) per access class is transmitted from the network to the UE. In this process, the network may inform the UE of access class information corresponding to data that any UE desires to transmit, or an access class and an access control value that should be used by a UE that has not discovered the access control value for the access class.

The present invention will now be described by taking an example of an operation of a UE having no stored access class information and an operation of a UE having stored access class information. Referring to FIG. 12, UE1 having no stored access class information may operate as follows.

S1200*a*. UE1 is a UE that has never accessed a network and, therefore, has no stored access class information.

S1201*a*. UE1 receives access control information for each access class from an eNB (i.e., RAN).

S1202*a*. UE1 acquires a parameter value designated as a default value from the access control information or a parameter value which is not designated and is usable by any access class and uses the parameter value for an access attempt.

Referring to FIG. 12, UE2 having stored access class information may operate as follows.

S1200*b*. UE2 is a UE to which a home network thereof or a previously accessed network allocates an access class value. However, if UE2 accesses a network different from the network that has allocated the access class value thereto, UE2 does not use the access class value allocated by the previous network. Alternatively, if a currently accessed cell or network does not transmit access control information for the allocated access class, the following operation may be performed.

S1201*b*. Similar to UE1, UE2 receives access control information for each access class from another network.

S1202*b*. Similar to UE1, UE2 performs access to the other network using a parameter value corresponding to a default value. Next, upon receiving a new access class value from the other network, UE2 uses the new access class value for access control.

As another method, upon receiving a value corresponding to an access class from the network, the UE may additionally receive a scope of the access class, i.e., information corresponding to a valid scope. For example, the scope information may indicate whether the access class value is valid only in a current network/PLMN, always valid, or valid only in a specific area. For example, if any UE receives information indicating 'access class=5' and information indicating 'scope=all PLMNs' by accessing a network of an operator to which the UE has subscribed and data satisfying a criterion of access class=5 is generated so that the UE attempts to perform access, the UE may recognize the access class as 5 and perform an operation even though the UE accesses any PLMN. However, when the UE receives information indicating 'access class=5' and information indicating 'scope=only home PLMN', if the UE accesses a network to which the UE has not subscribed or a network different from an HPLMN thereof, the UE cannot use the value of access class=5, even though traffic corresponding to access class=5 is generated so that the UE attempts to perform access.

A network may inform the UE of information as to which access class value the UE should use to access any PLMN from an HPLMN to which the UE has subscribed. For example, the network may command the UE to use access class 5 to access a PLMN from the HPLMN and use access class 100 to access another specific VPLMN from the HPLMN. Then, the UE may select an access class value which can be used in a specific situation or per network. If there is no access class value which can be used by the UE among values preconfigured by the network, the UE may use a default value to perform access. Like a UE that first attempts to access the network after purchase or service subscription, a UE having no access class value may use a default access class.

According to the present invention described with reference to FIG. 12, a plurality of access class values is allocated to the UE according to a network slice or application. Further, the present invention proposes supporting access control according to an access purpose such as legacy MMTel voice or CSFB, as well as access control according to an access service. To this end, the present invention proposes that one access class be allocated to each of MMTel voice and CSFB.

For example, the network may designate access class 10 for a terminating call through an SIB. In this case, when the UE performs access caused by the terminating call, the UE determines whether to perform access using a value corresponding to access class 10 among access control values received from the eNB. The UE may receive information about which access attempt corresponds to which access class from a CN etc. in a previous signaling process and information about which access attempt corresponds to which access class through the SIB transmitted by the eNB.

As another example, the terminating call may be designated as access class 10 through the standardization specification. Upon performing access caused by the terminating call, the UE determines whether to perform access using a value corresponding to access class 10 among access control values received from the eNB. In this case, although the UE has not received information indicating that the terminating call corresponds to access class 10 from the network, the UE may be aware of which access attempt corresponds to access class 10.

Alternatively, an access control value for a possibility/latency time (e.g., a barring rate or a mean duration of access control) for the terminating call may be directly transmitted through access control information. If the UE performs access caused by the terminating call, the UE determines whether to perform access using a value corresponding to the terminating call among the access control values received from the eNB. In this case, the UE may acquire an access control value corresponding to an access attempt even without using an additional access class value allocated by the network. For example, the network may combine information about a specific criterion, a barring rate, and mean duration information of access control, with respect to an access attempt satisfying a certain specific criterion, and transfer the combined information to the UE through the SIB. That is, if a method of separately transferring a pair of information {criterion information and class information} and a pair of information {class information, barring rate, and mean duration information of access control} is a first method, the above method of combined information may transfer a single pair of information {criterion information, barring rate, and mean duration information of access control} to the UE at a time in order to omit class information.

Meanwhile, for UEs of a special purpose or for access of a special purpose, the same treatment should be applied to the access even though any UE accesses any network. For example, it is assumed that a UE of any police officer has subscribed to operator A and operator A always provides an access opportunity of the highest class to the UE of the police officer. When data which is to be transmitted by the UE occurs, even if the police officer urgently performs transmission through a network of another operator other than operator A to which the UE has originally subscribed, the network of the other operator should also provide an access opportunity of the highest class to the UE of the police officer. To this end, the present invention proposes that common access class values be standardized for access of the special purpose. Each operator may allocate, to each UE, a different access class suitable for requirements thereof among values which are not designated for a special purpose in the standard specification. An example of access classes according to the present invention, defined in the standard specification, is shown below.

TABLE 2

| Access class | Criterion |
|---|---|
| 0 | default |
| 1 | Emergency Call |
| 2 | Access initiated by paging |
| 3 | Access by Public safety (e.g. police, fireman. etc.) |
| 4 | reserved |
| 5 | reserved |
| 6 | reserved |
| 7 | reserved |
| 8 | reserved |
| 9~XXX | Operator defined value |

Referring to Table 2, access classes 1 to 8 are defined in the standard specification and all operators, networks, and UEs equally interpret access classes 1 to 8. For example, access class 2 in Table 2 is allocated for access control related to a terminating call in all networks. Access classes 4 to 8 are reflected in the standard specification when needed.

Each operator may use values equal to or larger than access class 9 for its own purpose.

A selection criterion of a UE for access class 9 may differ according to each operator. The following table shows an example of access class allocation by an operator.

TABLE 3

| Access class | Criterion |
|---|---|
| 0 | default |
| 1 | Emergency Call |
| 2 | Access initiated by paging |
| 3 | Access by Public safety (e.g. police, fireman. Etc..) |
| 4 | reserved |
| 5 | reserved |
| 6 | reserved |
| 7 | reserved |
| 8 | reserved |
| 9 | UE for mIoT |
| 10 | V2X UE |
| 11 | Voice Call |
| 12 | IM service (KakaoTalk) |
| 13 | IM service (LINE, WeChat, etc.) |
| 14 | IP address = *.google.com |
| 15 | . . . |

Information broadcast by any RAN node of a network of an operator using Table 3 may be, for example, as follows.

TABLE 4

| Access class | Barring rate |
|---|---|
| 0 | 20 |
| 1 | 0% |
| 2 | 5% |
| 3 | 0% |
| 9 | 80 |
| 10 | 5 |
| 11 | 10 |

TABLE 4-continued

| Access class | Barring rate |
|---|---|
| 12 | 50 |
| 13 | 80 |
| 14 | 30 |
| 15 | ... |

Referring to Table 4, for example, the network always allows a UE for an emergency call and public safety to perform access. Even for the instant messaging (IM) services of the same kind, more access opportunities are assigned to KakaoTalk than other chat services.

The present invention has proposed a method of categorizing and controlling all accesses in one framework rather than performing an access check according to each UE class, each access purpose, or each application. Therefore, according to the present invention, even though a new criterion is introduced in the future, integrated access control will be performed through a method of allocating a new access class using the new criterion.

In a legacy access control process, access control parameters, i.e., a mean duration of access control and a barring rate, have been defined. However, a legacy barring rate may have a value of 5 to 95%. The present invention proposes the range of the barring rate be extended up to 0 to 100% rather than limiting the range to 5 to 95%. This means that, if the barring rate is 100%, access for a corresponding access class cannot be performed and, if the barring rate is 0%, access for the access class is always allowed to be performed. By extending the range of the barring rate to 0 to 100%, efficient improvement in separate transfer of information as to whether access class is allowed and access barring information can be achieved. That is, since the legacy barring rate has indicated only 5 to 95%, a network/eNB should inform a UE that access of a corresponding access class is barred in order for the network/eNB to indicate a barring rate of 0%. That is, according to a legacy access control method, both a field indicating whether access is barred and a field indicating a barring rate are needed to indicate a barring rate of 0%.

However, if any value among barring rates of 0 to 100% can be indicated, the field indicating whether access is barred may be omitted.

In the present invention, information as to whether or not access is allowed includes an access possibility and etc.

While the present invention has been described hereinabove using the term access class, various other terms such as an access category and an access priority group may be used instead of the access class, in order to avoid confusion with the access class which has been used in a legacy access control mechanism. According to the present invention, the network proposes a criterion for mapping a type of access to each UE by various combinations of load of the network, a configuration of each network slice, and a traffic type indicating whether traffic is a terminal call, an originating call, or signaling/data and causes the UE to determine whether a network access attempt can be made. When the access type is mapped, different accesses may be grouped into the same mapping and this has been provided as the term access class in the above description. That is, the proposals of the present invention have been described using a mapping method of the access class which has been used in 2G GSM, 3G WCDMA, or 4G LTE in order to aid in understanding the present invention. However, the proposal of the present invention has the purpose of being applied to a 5G mobile communication system or systems beyond the 5G mobile communication system and, upon mapping the access type, the access class which has been used in legacy 2G/3G/4G may also be used as one of various reference items of mapping or filtering. Accordingly, the access class should be divided into the term access class which can be used as one mapping criterion and an access category which is an access class indicating a group of mapped accesses. Therefore, in the above-described proposals of the present invention, the access class means the access category representing a group of mapped accesses by applying various criteria (e.g., a network slice, a call characteristic, an access class stored in a SIM of a UE, etc.), rather than a fixed value stored in the SIM as the meaning used in 2G/3G/4G.

Accordingly, the access class in the above description of the present invention may be replaced with the access category.

For reference, access control of the present invention is different from legacy ACDC as follows. In ACDC, applications have respective independent IDs, and are mapped to ACDC categories according to the application IDs. Hence, data which is not related to an application or data having no related application ID cannot be mapped to an ACDC category and access control cannot be performed with respect to this data. The present invention may apply various filters to access categories or different properties of filters to different access categories. Therefore, according to the present invention, even access other than an application or access for other purposes may be mapped to an access category. For example, although signaling for communication control (e.g., NAS signaling, RRC signaling, tracking area update, or an attach request) is not related to the application, the present invention may map signaling which is not related to the application to the access category and, therefore, access control for such signaling may be performed. In addition, access control of the present invention is different from ACDC which is limited to the application in that mapping for the access category can be performed according to a service characteristic such as a terminating call or an emergency call.

The access category may be variously mapped according to a criterion and an access category identifier may be allocated according to the access category. The following table shows access category mapping information configured by any network. The network or operator may transfer the following information to the UE.

TABLE 5

| Access category | Mapping Criterion | Note |
|---|---|---|
| 0 | default | Access not matching any other category criteria |
| 1 | Emergency Call | Access satisfying emergency call condition |
| 2 | Access initiated by paging | Access initiated by a response to paging |
| 3 | Access by Public safety (e.g. police, fireman. etc.) | Access related to public safety |
| 4 | reserved | |
| 5 | reserved | |
| 6 | Network slice = eMBB | Access started in eMBB network slice |
| 7 | Network slice = mIoT | Access started in mIoT network slice |
| 8 | reserved | |
| 9 | UE for mIoT | Access of UE configured for mIoT |
| 10 | V2X UE | Access of UE configured for V2X |

TABLE 5-continued

| Access category | Mapping Criterion | Note |
| --- | --- | --- |
| 11 | Voice Call | Access related to voice call |
| 12 | IM service (KakaoTalk) | Access of KakaoTalk application |
| 13 | IM service (LINE, WeChat, etc.) | Access of LINE/WeChat application |
| 14 | IP address = *.google.com | Access of data having IP address, domain name of google.com |
| 15 | . . . | . . . |

Figure 13:
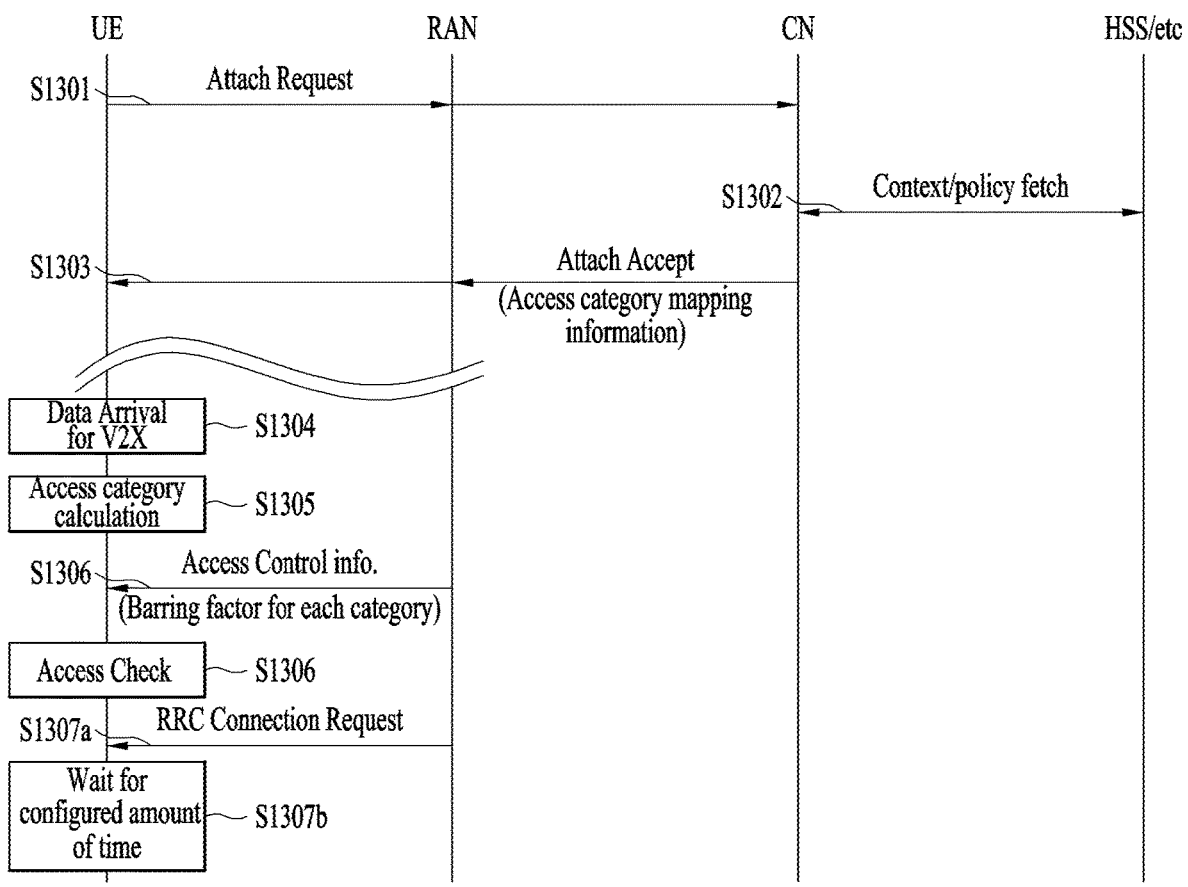
FIG. 13 illustrates another example of an access control mechanism according to the present invention.

FIG. 13 illustrates another example of an access control mechanism according to the present invention.

If a UE that has received mapping information for an access category needs to perform access to a network, the UE checks an access category corresponding to the access, using the access category mapping information. The UE determines an access category to which the access is mapped as a result of check. The UE receives access control information about the access category and performs an access control check. If the access control check is passed, the UE actually attempts to access the network and, if not, the UE stops an access attempt during a predetermined time period. Access control of the present invention using the access category mapping information will now be described with reference to FIG. 13.

S1301. A UE selects a network that the UE is to access and transmits an attach request message to the network.

S1302. The network fetches information about a context and a system policy for the UE.

S1303. The network transmits an attach accept message to the UE. The network also transfers information indicating to which access category each access is mapped, through the attach accept message. The UE stores the received access category mapping information.

S1304. Next, data is generated in a V2X application of the UE.

S1305. The UE checks to which access category the data generated in step S1304 is mapped, using the previously received access category mapping information. For example, referring to Table 5, the data is mapped to access category 10.

S1306. The UE receives access control information through an SIB. The UE determines access control information corresponding to an access category checked in step S1305, using the access control information. For example, if it is determined that an access category of data to be transmitted is 10, the UE checks whether the UE is allowed to perform access to the network, using access control information (e.g., barring rate) corresponding to access category 10.

S1307a. If an access control check is passed in step S1306, the UE transmits an RRC connection request message to an eNB.

S1307b. If the access control check is not passed in step S1306, the UE does not perform an access attempt for a predetermined period of time.

In the example of FIG. 13, the network may transfer overall access categories applied thereto and mapping information for the access categories to the UE. However, according to a network slice to which each UE has subscribed, a data characteristic, or a service characteristic, each UE may use only a portion of access categories rather than using all access categories. Therefore, in order to reduce the amount of signaling messages or to reduce processing burden of the UE, the network may transfer only access category information applied to each UE. For example, referring to Table 5, different mapping information may be transferred to a smartphone user and a vehicle used in a police station as shown in Table 6 and Table 7. Table 6 lists information transferred to a smartphone and Table 7 lists information transferred to a UE of a police vehicle. Referring to Table 6, information except for access category information related to public safety/V2X/mIoT may be transferred to the smartphone user. Referring to Table 7, only access category information related to a vehicle or public safety may be transferred to the police vehicle.

TABLE 6

| Access category | Criterion | |
| --- | --- | --- |
| 0 | default | Access not matching any other category criteria |
| 1 | Emergency Call | Access satisfying emergency call condition |
| 2 | Access initiated by paging | Access initiated by response to paging |
| 6 | Network slice = eMBB | Access started in eMBB network slice |
| 11 | Voice Call | Access related to voice call |
| 12 | IM service (KakaoTalk) | Access of KakaoTalk application |
| 13 | IM service (LINE, WeChat, etc.) | Access of LINE/WeChat application |
| 14 | IP address = *.google.com | Access of LINE/WeChat application |

TABLE 7

| Access category | Mapping Criterion | |
| --- | --- | --- |
| 0 | default | Access not matching any other category criteria |
| 1 | Emergency Call | Access satisfying emergency call condition |
| 3 | Access by Public safety (e.g. police, fireman. etc.) | Access related to public safety |
| 10 | V2X UE | Access of UE configured for V2X |
| 11 | Voice Call | Access related to voice call |

Figure 14:
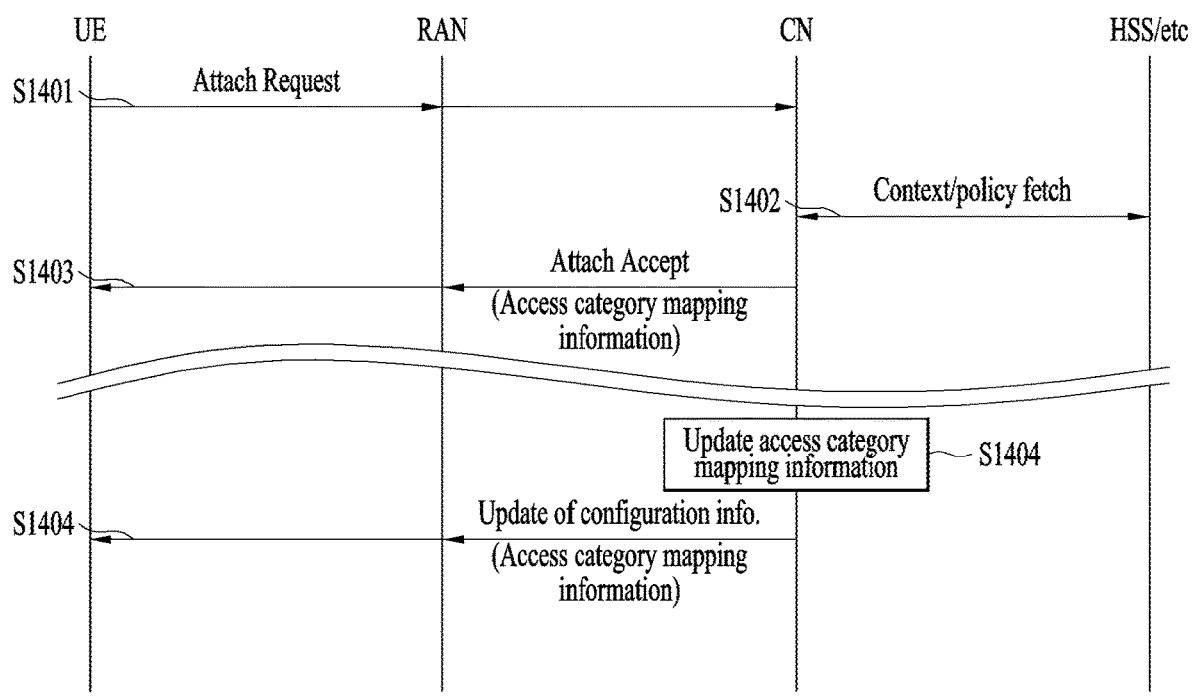
FIG. 14 illustrates another example of an access control mechanism according to the present invention.

FIG. 14 illustrates another example of an access control mechanism according to the present invention.

In the present invention, a network may (dynamically) transmit mapping for an access category, i.e., mapping information, to a UE. This is advantageous in that the network can flexibly change mapping information according to a situation of the network. For example, any operator may divide or integrate mapping information allocated to each slice according to the number of users per slice, subscribing to a network thereof, an average charge per slice user, or QoS requirements per slice. Alternatively, the network may change used mapping information according to variation in the number of subscribers or variation in service requirements, so that the network may cause the UE to more effectively control access of each situation. Access control of the present invention, including update of mapping information, will now be described with reference to FIG. 14.

S1401. The UE selects a network that the UE is to access and transmits an attach request message to the network.

S1402. The network fetches information about a context and a system policy for the UE.

S1403. The network transmits an attach accept message to the UE. The network also transmits information indicating to which access category each access is mapped, through the attach accept message. The UE stores the received access category mapping information.

S1404. Next, the network may determine to update the access category mapping information for reasons such as variation in the number of subscribers and variation in a network slice configuration.

S1405. The network transfers the access category mapping information updated in step S1404 to the UE. The UE uses the updated mapping information starting from the next access attempt.

Assuming that mapping information prior to update is as listed in Table 5, for example, the updated mapping information may be as follows. Updated content compared with Table 5 is underlined in Table 8.

TABLE 8

| Access category | Mapping Criterion | Note |
| --- | --- | --- |
| 0 | default | Access not matching any other category criteria |
| 1 | Emergency Call | Access satisfying emergency call condition |
| 2 | Access initiated by CN paging | Access initiated by response to paging started in CN |
| 3 | Access initiated by RAN paging | Access initiated by response to paging started in RAN |
| 4 | reserved | |
| 5 | reserved | |
| 6 | Network slice = eMBB | Access started in eMBB network slice |
| 7 | Network slice = mIoT | Access started in mIoT network slice |
| 8 | reserved | |
| 9 | UE for mIoT | Access of UE configured for mIoT |
| 10 | V2X UE | Access of UE configured for V2X |
| 11 | Voice Call | Access related to voice call |
| 12 | IM service (KakaoTalk) | Access of KakaoTalk application |
| 13 | IM service (LINE, WeChat, etc.) | Access of LINE/WeChat application |
| 14 | IP address = *.google.com | IP address. Access of data having domain name of google.com |
| 15 | . . . | . . . |

Table 8 shows that the contents of, for example, access categories 2 and 3 are changed. Paging includes RAN paging started in an RAN such as an eNB and CN paging started in an MME/AMF. UEs which have been introduced to the market up to now support only CN paging. Therefore, the network will allocate access initiated by a response to paging to access category 2 at an early stage without distinguishing paging. However, as time elapses, if more UEs supporting RAN paging are introduced to the market, the network may distinguish between RAN paging and CN paging to give different access opportunities. For example, in the case of RAN paging, since the RAN includes a context of each UE, the network may set an access probability of a UE corresponding to RAN paging to be higher than an access probability of a UE corresponding to CN paging in order to cause the UE corresponding to RAN paging to rapidly access the network. Therefore, as compared with the case in which an access class is fixed in a SIM like legacy 2G/3G/4G to perform access control, if an access category allocated to the UE varies with a policy/situation of the network as in the present invention, the network may minutely control an adjustment unit of access control according to a characteristic of each access, so that system resources may be more efficiently distributed.

In the present invention, a step of transferring mapping information for mapping each access to the UE by the network is distinguished from a step of transferring actual information used for an access control check to the UE by the network according to an access category. One of information used for the access control check is a barring factor. The barring rate (this is also referred to as a barring rate) may be used as follows:

S1. The UE randomly selects one of numbers between 0 and 1.

S2. The UE compares the number selected in step S1 with a barring rate value transmitted by the network. If the value selected in step S1 is less than the barring rate, access is allowed and, if the value selected in step S1 is greater than the barring rate, access is not allowed.

In other words, as described with reference to ACB, the UE determines a barring status using information provided by a serving network and perform an access attempt. The UE draws a uniform random number between 0 and 1 upon initiating connection establishment and determines whether an access attempt is barred by comparing the random number with a current barring rate. If the uniform random number is less than the current barring rate and the type of the access attempt is indicated to be allowed, the access attempt is allowed. Otherwise, the access attempt is not allowed. If the access attempt is not allowed, further access attempts of the same type are barred for a time period calculated based on the 'mean duration of access control' provided by the network and the random number drawn by the UE.

Assuming that the UE selects a value between 0 and 1 with the same probability, the barring rate or the barring factor determines a probability with which the UE actually passes an access control check.

Figure 15:
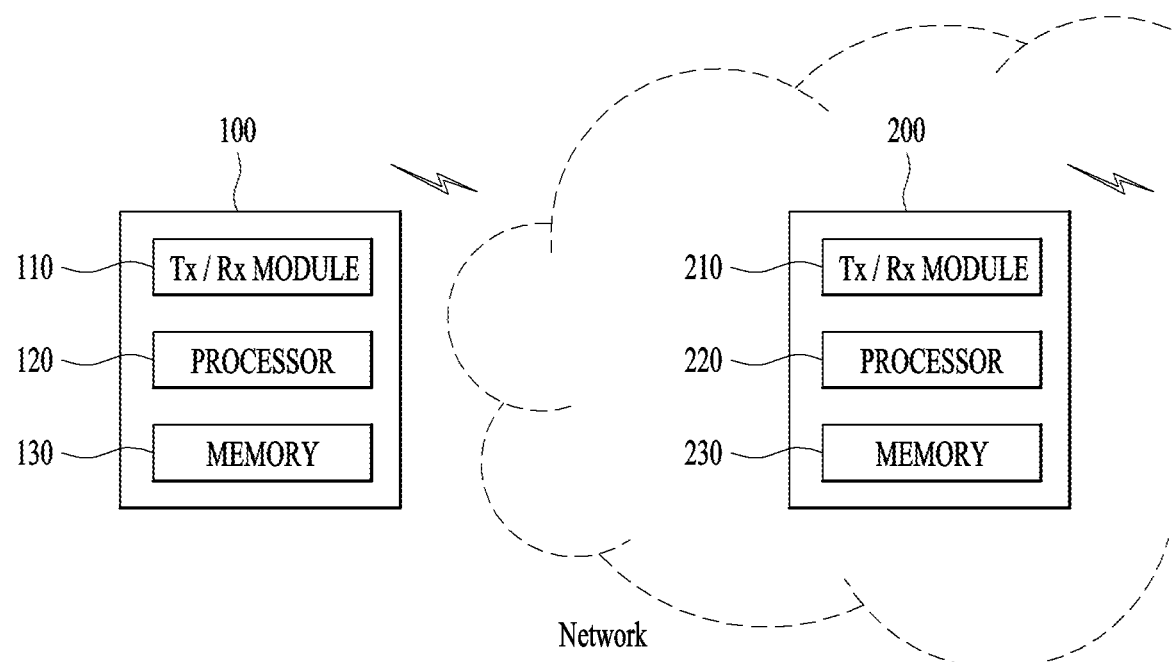
FIG. 15 illustrates a node device applied to the suggestion of the present invention.

FIG. 15 illustrates configuration of a UE and a network node according to a preferred embodiment of the present invention.

The UE 100 according to the present invention may include a transmission/reception (Tx/RX) module 110, a processor 120, and a memory 130. The Tx/RX module 110 may be referred to as a radio frequency (RF) unit. The Tx/RX module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 15, the network node 200 according to the present invention may include a Tx/RX module 210, a processor 220 and a memory 230. The Tx/RX module 210 may be referred to as an RF unit. The Tx/RX module 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The Tx/RX module 110 of the UE 100 may receive mapping information for access classes or access categories according to the present invention from a network or an eNB. The mapping information may indicate access categories which differ according to a mapping criterion such as a network slice, an IP address, an access cause, and/or an access class. The mapping information may include an access category which does not match any mapping criterion as a default access category. The Tx/RX module 110 may receiving barring information for the access classes/categories according to the present invention. If data is generated in the UE 100, the processor 120 of the UE 100 may determine an access class/category to which the data belongs based on the mapping information. The processor 120 selects a possibility value for randomly performing an access attempt. If the possibility value is lower than a value caused by barring information for the access class/category to which the data belongs, the processor 120 may determine that access to the network is allowed and, if not, the processor 120 may determine that access to the network is barred. If an access attempt is allowed, the processor 120 may control the Tx/RX module 110 to transmit an access request, for example, an RRC connection request message, to the network or the eNB. The Tx/RX module 110 may receive updated mapping information and/or updated barring information. If the mapping information and/or the barring information is updated, the processor 120 may apply the updated mapping information and/or barring information to a next new access attempt.

The processor 220 of the network node 200 may generate the mapping information for access classes or access categories according to the present invention. The mapping information may indicate access categories which differ according to a mapping criterion such as a network slice, an IP address, an access cause, and/or an access class. The mapping information may include an access category which does not match any mapping criterion as a default access category. The processor may generate barring information for the access classes/categories according to the present invention. The Tx/RX module 210 of the network node 200 may transmit the mapping information to UEs in a specific area or to a specific UE. The Tx/RX module 210 may transmit the barring information. The Tx/RX module 210 may receive an access request message from the UE(s). The processor 220 may update the mapping information and/or the barring information. The processor 220 may control the Tx/RX module 210 to transmit the updated mapping information and/or barring information.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:
1. A method of controlling an access attempt to a network by a user equipment (UE) in a wireless communication system, the method comprising:
 receiving first mapping information for at least one access category defined by an operator of the network;
 receiving barring information;
 determining an access category for an access attempt type that is associated with the access attempt from among a plurality of access categories based on mapping information; and
 determining whether to perform the access attempt to the network based on (i) the determined access category for the access attempt type that is associated with the access attempt and iii) the barring information,
 wherein the plurality of access categories includes (i) the at least one access category defined by the operator of the network and (ii) access categories defined in a standard specification for the wireless communication system,
 wherein the mapping information defines mapping relation between the plurality of access categories and a plurality of access attempt types, respectively,
 wherein the mapping information includes (i) the first mapping information for the at least one access category defined by the operator of the network and (ii) second mapping information for the access categories defined in the standard specification,
 wherein the at least one access category defined by the operator of the network includes an access category for a network slice, and
 wherein the first mapping information at least defines mapping relation between the access category for the network slice and the network slice.

2. The method of claim 1,
wherein the access categories defined in the standard specification include at least (i) an access category for access initiated by paging and (ii) an access category for emergency call.

3. The method of claim 1,
wherein the access categories defined in the standard specification are mapped to predefined access category numbers, respectively, and
wherein each of the at least one access category defined by the operator of the network is mapped, based on the first mapping information, to one of access category numbers reserved for operator-defined access categories.

4. The method of claim 1,
wherein determining whether to perform the access attempt comprises: determining whether the access attempt is allowed, based on (i) the determined access category for the access attempt type that is associated with the access attempt and (ii) the barring information, and
wherein the method further comprises: performing the access attempt based on a determination that the access attempt is allowed, and not performing the access attempt based on a determination that the access attempt is not allowed.

5. The method of claim 1,
wherein the barring information includes access control information for at least one of the plurality of access categories.

6. A user equipment (UE) configured to control an access attempt to a network in a wireless communication system, the UE comprising,
a transceiver;
at least one processor; and
at least one computer memory operably connectable to the at least one processor and storing instructions that, based on being executed by the at least one processor, perform operations comprising:
receiving, via the transceiver, first mapping information for at least one access category defined by an operator of the network;
receiving, via the transceiver, barring information; and
determining an access category for an access attempt type that is associated with the access attempt, from among a plurality of access categories based on mapping information; and
determining whether to perform the access attempt to the network, based on the determined access category for the access attempt type that is associated with the access attempt and (ii) the barring information,
wherein the plurality of access categories includes (i) the at least one access category defined by the operator of the network and (ii) access categories defined in a standard specification for the wireless communication system,
wherein the mapping information defines mapping relation between the plurality of access categories and a plurality of access attempt types, respectively,
wherein the mapping information includes (i) the first mapping information for the at least one access category defined by the operator of the network and (ii) second mapping information for the access categories defined in the standard specification,
wherein the at least one access category defined by the operator of the network includes an access category for a network slice, and
wherein the first mapping information at least defines mapping relation between the access category for the network slice and the network slice.

7. The UE of claim 6,
wherein the access categories defined in the standard specification include at least (i) an access category for access initiated by paging and (ii) an access category for emergency call.

8. The UE of claim 6,
wherein the access categories defined in the standard specification are mapped to predefined access category numbers, respectively, and
wherein each of the at least one access category defined by the operator of the network is mapped, based on the first mapping information, to one of access category numbers reserved for operator-defined access categories.

9. The UE of claim 6,
wherein determining whether to perform the access attempt comprises: determining whether the access attempt is allowed, based on (i) the determined access category for the access attempt type that is associated with the access attempt and (ii) the barring information, and
wherein the operations further comprise: performing the access attempt based on a determination that the access attempt is allowed, and not performing the access attempt based on a determination that the access attempt is not allowed.

10. The UE of claim 6,
wherein the barring information includes access control information for at least one of the plurality of access categories.

11. A processing apparatus configured to control a user equipment (UE) to control an access attempt to a network in a wireless communication system, the processing apparatus comprising,
at least one processor; and
at least one computer memory operably connectable to the at least one processor and storing instructions that, based on being executed by the at least one processor, perform operations comprising:
receiving first mapping information for at least one access category defined by an operator of the network;
receiving barring information; and
determining an access category for an access attempt type that is associated with the access attempt, from among a plurality of access categories based on mapping information; and
determining whether to perform the access attempt to the network, based on (i) the determined access category for the access attempt type that is associated with the access attempt and (ii) the barring information,
wherein the plurality of access categories includes (i) the at least one access category defined by the operator of the network and (ii) access categories defined in a standard specification for the wireless communication system,
wherein the mapping information defines mapping relation between the plurality of access categories and a plurality of access attempt types, respectively,
wherein the mapping information includes (i) the first mapping information for the at least one access category defined by the operator of the network and (ii) second mapping information for the access categories defined in the standard specification, wherein the at least one access category defined by the operator of the network includes an access category for a network slice, and wherein the first mapping information at least defines mapping relation between the access category for the network slice and the network slice.

12. The processing apparatus of claim 11, wherein the access categories defined in the standard specification include at least (i) an access category for access initiated by paging and (ii) an access category for emergency call.

13. The processing apparatus of claim 11, wherein the access categories defined in the standard specification are mapped to predefined access category numbers, respectively, and wherein each of the at least one access category defined by the operator of the network is mapped, based on the first mapping information, to one of access category numbers reserved for operator-defined access categories.

14. The processing apparatus of claim 11, wherein determining whether to perform the access attempt comprises: determining whether the access attempt is allowed, based on (i) the determined access category for the access attempt type that is associated with the access attempt and (ii) the barring information, and wherein the operations further comprise: performing the access attempt based on a determination that the access attempt is allowed, and not performing the access attempt based on a determination that the access attempt is not allowed.

15. The processing apparatus of claim 11, wherein the barring information includes access control information for at least one of the plurality of access categories.

\* \* \* \* \*

UNITED STATES PATENT AND TRADEMARK OFFICE
CERTIFICATE OF CORRECTION

Page 1 of 1

PATENT NO. : 10,798,639 B2
APPLICATION NO. : 16/322757
DATED : October 6, 2020
INVENTOR(S) : Sungduck Chun, Jaehyun Kim and Ki-Dong Lee It is certified that error appears in the above-identified patent and that said Letters Patent is hereby corrected as shown below:

On the Title Page

In Item (71), Applicant, Column 1, Line 1, after "LG Electronics," delete "iNC.," and insert -- Inc., --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*